US007918736B2

(12) United States Patent
Walker et al.

(10) Patent No.: US 7,918,736 B2
(45) Date of Patent: Apr. 5, 2011

(54) METHOD AND APPARATUS FOR USING CONDITIONAL PARAMETERS TO ALTERNATE BETWEEN WAGERING GAMES

(75) Inventors: Jay S. Walker, Ridgefield, CT (US); James A. Jorasch, New York, NY (US); Robert C. Tedesco, Fairfield, CT (US); Daniel E. Tedesco, Huntington, CT (US); Stephen C. Tulley, Monroe, CT (US)

(73) Assignee: IGT, Reno, NV (US)

( * ) Notice: Subject to any disclaimer, the term of this patent is extended or adjusted under 35 U.S.C. 154(b) by 554 days.

(21) Appl. No.: 11/299,341

(22) Filed: Dec. 9, 2005

(65) Prior Publication Data

US 2006/0121972 A1 Jun. 8, 2006

(51) Int. Cl.
*A63F 13/00* (2006.01)

(52) U.S. Cl. ................. 463/42; 463/20; 463/25; 463/40

(58) Field of Classification Search .................... 463/25, 463/26, 36, 16, 20, 22, 40, 42
See application file for complete search history.

(56) References Cited

U.S. PATENT DOCUMENTS

| | | | | |
|---|---|---|---|---|
| 5,820,459 | A | 10/1998 | Acres et al. | 463/25 |
| 5,836,817 | A | 11/1998 | Acres et al. | 463/26 |
| 5,951,397 | A | 9/1999 | Dickinson | 463/36 |
| 6,244,958 | B1 | 6/2001 | Acres | 463/26 |
| 6,254,483 | B1 | 7/2001 | Acres | 463/26 |
| 6,319,125 | B1 | 11/2001 | Acres | 463/25 |
| 6,361,437 | B1 * | 3/2002 | Walker et al. | 463/23 |
| 6,398,645 | B1 | 6/2002 | Yoseloff | 463/19 |
| 6,648,758 | B2 | 11/2003 | Bennett et al. | 463/20 |
| 6,652,378 | B2 | 11/2003 | Cannon et al. | 463/20 |
| 6,656,040 | B1 | 12/2003 | Brosnan et al. | 463/16 |
| 6,939,226 | B1 | 9/2005 | Joshi | 463/20 |
| 6,960,136 | B2 | 11/2005 | Joshi et al. | 463/25 |
| 2003/0060268 | A1 | 3/2003 | Falconer | 463/20 |
| 2003/0064771 | A1 * | 4/2003 | Morrow et al. | 463/16 |
| 2005/0233794 | A1 * | 10/2005 | Cannon et al. | 463/16 |

FOREIGN PATENT DOCUMENTS

| | | | |
|---|---|---|---|
| EP | 0 655 265 | A1 | 5/1995 |
| EP | 1 610 275 | A1 | 12/2005 |
| WO | WO 98/56475 | | 12/1998 |
| WO | WO 99/10849 | | 3/1999 |
| WO | WO 03/028830 | A1 | 4/2003 |
| WO | WO 03/041825 | A1 | 5/2003 |

OTHER PUBLICATIONS

Office Action for U.S. Appl. No. 11/456,097 dated Mar. 20, 2008.
International Search Report for Serial No. PCT/US/06/61785 dated Sep. 26, 2007.
Written Opinion for Serial No. PCT/US/06/61785 dated Sep. 26, 2007.

(Continued)

*Primary Examiner* — James S McClellan
(74) *Attorney, Agent, or Firm* — K&L Gates LLP

(57) ABSTRACT

A wagering method is provided that allows players or gaming establishments to specify conditions which when satisfied, reconfigure the gaming device to change game play from a first game to a second game. The condition may depend upon the value of a parameter—generally related to game play—to determine if the condition is valid and triggers the reconfiguration. The second game may be selected from a game on the same gaming device, from a game on a different gaming device, or a game played by a specific player.

18 Claims, 11 Drawing Sheets

OTHER PUBLICATIONS

Office Action for U.S. Appl. No. 11/456,098 dated Apr. 25, 2008, 11 pp.

Office Action for U.S. Appl. No. 11/736,393 dated May 9, 2008, 5pp.

* cited by examiner

400

| PARAMETER 402 | GAME A 404 | MACHINE A 406 |
| --- | --- | --- |
| CONSECUTIVE WINS | N/A | 0 |
| CONSECUTIVE LOSSES | N/A | 7 |
| TOP PAYOUT LAST 12 HOURS | 10,000 | 1,250 |
| TOTAL PAID LAST 24 HOURS | 64,051.25 | 2,325.05 |
| NUMBER OF PLAYERS CURRENTLY PLAYING | 31 | N/A |
| PERCENTAGE OF ALL PLAYERS CURRENTLY PLAYING | 8.6% | N/A |

FIG. 4

500

| INSTRUCTION 510 | CONDITION 512 |
|---|---|
| SWITCH TO "GAME B" | 10 CONSECUTIVE LOSSES ON "GAME A" |
| SWITCH TO "MACHINE B" | $100 OR MORE LOST ON "MACHINE A" |
| OUTPUT OFFER TO SWITCH TO "MACHINE B" | "MACHINE B" HAS PAID OUT ≥ X COINS IN LAST HOUR |
| OUTPUT OFFER TO SWITCH TO "GAME B" | MORE THAN X% OF PLAYERS ON FLOOR CURRENTLY PLAYING "GAME B" |
| OUTPUT OFFER TO SWITCH TO "GAME X" | "GAME X" IS CURRENTLY MOST POPULAR GAME ON FLOOR |

FIG. 5

600

| PLAYER 602 | GAMING DEVICE 604 | GAME TYPE 606 | "PIGGYBACK" MACHINE 608 | "PIGGYBACK" PLAYER 610 | OFFERED ALTERNATE GAMES 612 |
|---|---|---|---|---|---|
| P-1 | GD-1 | GT-1 | N/A | N/A | GT-2, GD-5 |
| P-2 | HGD-1 (HAND-HELD) | (GT-4) | GD-4 | N/A | N/A |
| P-3 | 123.45.XX (PC IP ADDRESS) | (GT-1) | (GD-1) | P-1 | N/A |

FIG. 6

700

| PLAYER ID 710 | SOCIAL SECURITY NUMBER 712 | NAME 714 | ADDRESS 716 | PHONE NUMBER 718 | CREDIT CARD NUMBER 720 | CREDIT BALANCE 722 | (ACCUMULATED) COMP. POINTS 724 | HOTEL GUEST 726 | PLAYER RATING 728 |
|---|---|---|---|---|---|---|---|---|---|
| 123456 | 123-45-7890 | BILL GREEN | 111 NORTH AVE. | (212) 555-1234 | 1111-2222-3333-4444 | $25.00 | 130 PTS. | NO | 4 |
| 876543 | 876-54-3210 | ROB BLUE | 423 SOUTH ST. | (812) 555-4321 | 2222-4444-6666-8888 | $17.50 | 240 PTS. | YES | 2 |
| 158595 | 555-12-6338 | KAREN RED | 64 WEST RD. | (315) 555-5954 | 1111-3333-5555-7777 | $0.00 | 350 PTS. | YES | 2 |

FIG. 7

METHOD AND APPARATUS FOR USING CONDITIONAL PARAMETERS TO ALTERNATE BETWEEN WAGERING GAMES

FIELD

The method and apparatus relates to gaming apparatus and methods, and in particular to wagering methods that use one or more selected parameters to trigger the reconfiguration of a gaming device.

BACKGROUND

Gaming has become an increasingly important industry in the United States and around the world. In games of chance, a player typically places a wager on one or more games, and either receives a payout or loses the wager based on the game outcome. Examples of gaming devices include, without limitation, video poker gaming devices, mechanical reel slot machines, and video slot machines.

Traditionally, players have been relegated to playing a single game on a gaming device. More recently, some gaming devices allow players to select a game from multiple games on a single gaming device. For example, some gaming devices allow players to navigate a "menu" system for selecting different types of games. The player selects a game from the menu and plays until another game is desired. The player then exits the game and returns to the menu screen to select another game (e.g., a player plays a Keno game, backs out to a menu screen, selects a video poker game, and continues play on the video poker game). This particular machine stores each of the offered games internally in its electronic memory.

This manual switching between games is time-consuming and cumbersome for many players. In addition, this manual game switching falls short of adding substantial new interest in the game play. New methods are needed for alternating between games on the gaming devices to provide greater entertainment value.

SUMMARY

A need exists for methods that enable rapid switching between a plurality of games at an individual gaming device. The switching may be automatic between games based on satisfying predetermined conditions. The predetermined conditions (or conditions determined on the fly) allow seamless switching between games—without the need for player intervention in the selection of the game. In an alternate embodiment, if desired, the specific condition can be predetermined, and if triggered, the player may be presented with an offer, which the player may either accept or reject. Various other methods of reconfiguring gaming devices based on the satisfaction of predetermined conditions are contemplated.

Conditions may be specified by the player, the operator of the game establishment (either directly or indirectly by the gaming device as determined by software programming), a manufacturer of the gaming device, or another entity. In some embodiments, the conditions that trigger changes in game play may be related to the player's game play (e.g., the success of the player, the rate of play of the gaming device, etc.). In some embodiments, conditions that trigger changes in game play may also be related to other player's game play and other gaming device's game play results. For example, automatic game switching may be triggered by conditions requiring the selection of the "hottest" game in the gaming establishment, the "coldest" game in the gaming establishment, the most successful player, etc.

Using the features and methods described herein, the player has a means to indirectly or directly specify the game the player may be most interested in playing, allowing the gaming device (or the gaming network 100) to locate this game and present it to the player. Without the features and methods described herein, considerable time and energy may be wasted as a player tries to find and/or switch to the game that satisfies the player's requirements and interest.

BRIEF DESCRIPTION OF THE DRAWINGS

Various embodiments are described herein with reference to the accompanying drawings. In the drawings, like reference numerals indicate identical or functionally similar elements. The leftmost digit(s) of a reference numeral typically identifies the figure in which the reference numeral first appears. As will be understood by those skilled in the art, the drawings and accompanying descriptions presented herein indicate some exemplary arrangements. Similarly, the illustrated entries represent exemplary information, but those skilled in the art will understand that the number and content of the entries can be different from those illustrated herein. A brief description of the drawings follows.

FIG. 4 is an example of a parameters database;

FIG. 5 is an example of a reconfiguration database;

FIG. 6 is an example of a network configuration database of the gaming devices, players, and other devices in the gaming network;

FIG. 7 is an example of a player database that may be associated with a player tracking program;

DETAILED DESCRIPTION OF EMBODIMENTS

Numerous embodiments are described in this patent application, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be used and that structural, logical, software, electrical and other changes may be made without departing from the scope of the present invention. Accordingly, those skilled in the art will recognize that the present invention may be practiced with various modifications and alterations.

Although particular features may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

Certain embodiments will now be described in detail with reference to the drawings. Although the embodiments discussed herein are directed to video gaming devices (e.g., video poker machines, video blackjack machines, video roulette, video keno, and the like), it should be understood that the embodiments are equally applicable to slot type gaming devices with mechanical reels.

At least some embodiments described herein are directed generally to a method and apparatus for automatically altering game play in a gaming device when a predetermined condition is satisfied and triggers the reconfiguration of the gaming device. The condition that triggers the reconfiguration, as well as the manner in which the gaming device will be reconfigured if the condition is satisfied, may be determined either by the player or by the operator of the gaming establishment (through the gaming device's programming). Such a reconfiguration may alter game play in a number of different ways. For example, the type of game played may be changed (e.g., from poker to blackjack), the gaming device from which the game outcome is received is changed, the game may be subtly altered (e.g., adding a bonus game, adding pay lines, adding more wild symbols, etc.), etc.

Figure 1:
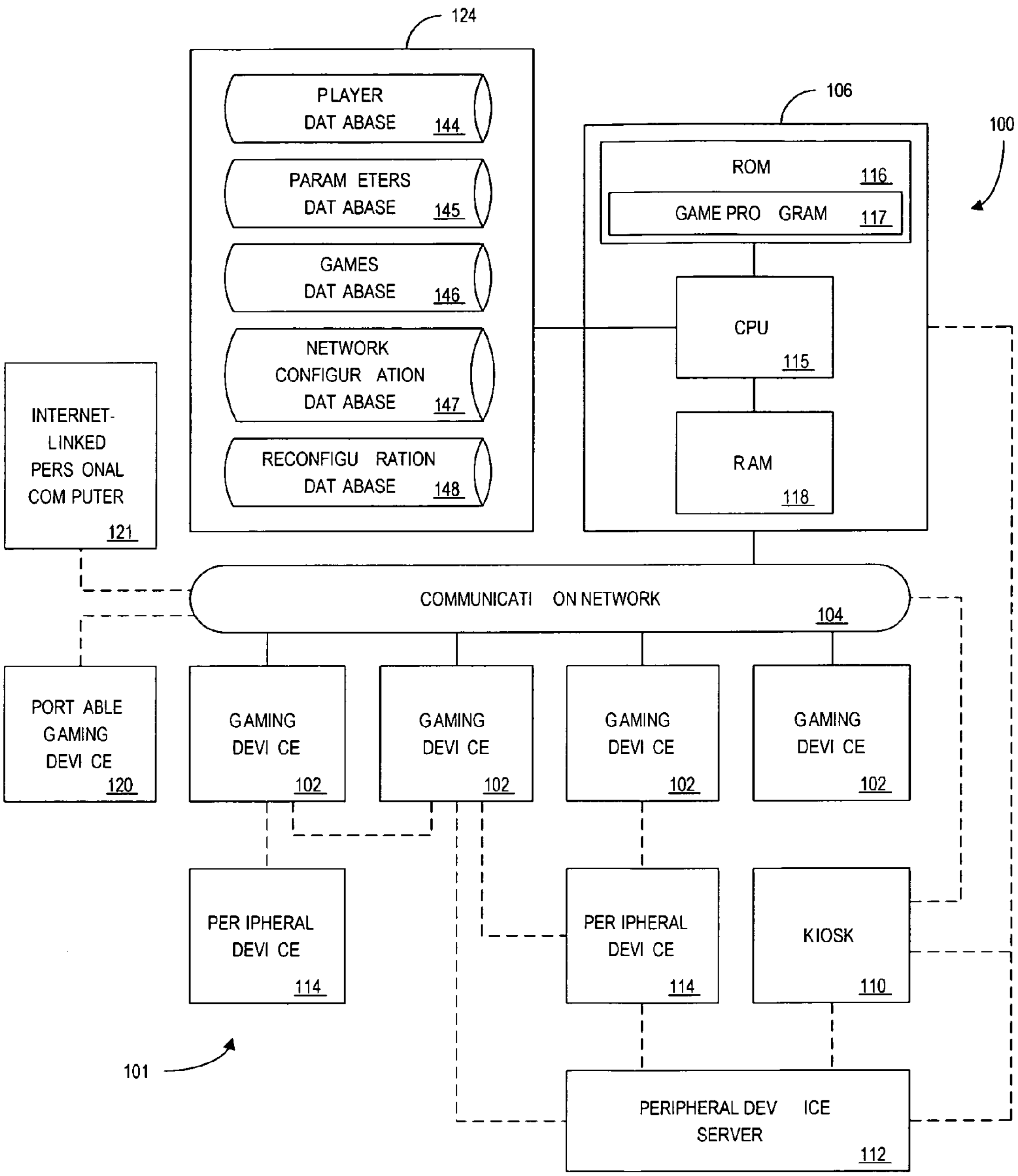
FIG. 1 is an overall schematic view of one embodiment of a gaming network.

Any or all the above triggered changes in game play can be achieved either by a stand-alone gaming device or by a gaming device in cooperation with a gaming network. For example, the gaming device may be configured to work in a gaming network 100 as shown in FIG. 1. In this environment, the gaming device 102 and the gaming network 100 in which the gaming device is connected operate together to reconfigure a gaming device to alter game play.

Referring now to FIG. 1, illustrated therein is an example embodiment of a gaming network 100 that may be used to implement one or more embodiments described herein. The gaming network 100 of FIG. 1 includes a plurality of network devices 101 that are directly or indirectly in communication with the gaming network 100 to accept wagers, determine game outcomes, and provide payouts for winning game outcomes. Among these network devices 101 are: a gaming server 106 that is in communication with one or more other network devices, such as gaming devices 102 (e.g., video slot machines, video poker machines, mechanical reel slot machines), kiosks 110, casino personnel devices (not shown), merchant point-of-sale (POS) terminals (not shown), peripheral device servers 112, component devices (e.g., display screens) (not shown), peripheral devices 114 (e.g., card readers), handheld gaming devices 120 (e.g., PDA or cell phone), and an internet linked personal computer 121. These devices and their functions are described in detail below.

Each gaming device 102, and every other network device 101 in the gaming network 100 that communicates with another network device in the gaming network, is uniquely identified by a device identification (ID) number, to allow communication with the gaming server 106 via the gaming network 100. The gaming network 100 may communicate with devices directly or indirectly, via a wired or wireless medium to a communication network 104 such as the Internet, LAN, WAN or Ethernet, Token Ring, or via any appropriate communications means or combination of communications means. It is to be understood, however, that other arrangements in which the gaming devices 102 communicate with the server 106 are also possible.

A variety of communications protocols may be part of the system, including but not limited to: Ethernet (or IEEE 802.3), SAP, SAS, SUPERSAS, ATP, BLUETOOTH, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device 102 and various component devices and/or peripheral devices 114 (e.g., printers, bill acceptors, etc.), (ii) the Best of Breed (BOB) standard, which may facilitate communication between a gaming device 102 and various servers 106 related to play of one or more gaming devices (e.g., servers that assist in providing accounting, player-tracking, content management, ticket-in/ticket-out and progressive jackpot functionality), and/or (iii) the System-to-System (S2S) standard, which may facilitate communication between game-related servers 106 and/or casino property management servers (e.g., a hotel server comprising one or more databases that store information about booking and reservations). Communication may be encrypted to ensure privacy and prevent fraud in any of a variety of ways well known in the art.

The gaming device 102 may be implemented as a system server, a dedicated hardware circuit, an appropriately programmed general-purpose computer, or any other equivalent electronic, mechanical or electromechanical device. The gaming device 102 may comprise any or all of the gaming devices of the aforementioned systems.

In some embodiments, a gaming device 102 may comprise a handheld gaming device 120—for example, a portable handheld gaming device (e.g., a device similar to a PDA) or a cell phone that may be used in place of, or in addition to, some or all of the gaming device components. The handheld gaming device 120 may be used to view "walk away" game outcomes from a gaming device 102.

In this situation, the handheld gaming device 120 is in communication with the gaming device 102 in the gaming network 100. Game outcomes are automatically generated by the gaming device 102 and communicated to the player on the handheld gaming device 120. This allows the player the convenience of walking anywhere in the gaming establishment and still receive game outcomes from the player's gaming device 102. The gaming server 106, in one embodiment, may communicate game outcomes from a player's gaming device 102 to the player's handheld gaming device 120 (such as a PDA or cell phone) to enable a player to remotely view game outcomes received from the gaming device.

Further, a gaming device 102 may comprise an Internet linked personal computer 121 that may be operable to communicate with an online casino and facilitate game play at the online casino. In one embodiment, the Internet linked personal computer 121 may receive game outcomes produced by a gaming device 102 in the gaming establishment similar to the portable gaming device 120 described above. In one embodiment, the gaming server 106 communicates the game outcomes received from a player's gaming device 102 to the player's personal computer 121.

The peripheral device server 112 may be available to provide additional communication capabilities between peripheral devices 114 in the gaming network 100. These peripheral devices 114 may include player-tracking devices, additional screen displays, ticket readers and printers, etc.

In some embodiments, a kiosk 110 may be configured to execute or assist in the execution of various processes of the gaming network 100. In some embodiments, a kiosk 110 may comprise a processor and a memory. A kiosk 100 may also comprise various input devices (e.g., a keypad, a keyboard, a mouse, buttons, a port that receives player tracking cards, an optical scanner for reading barcodes or other indicia, a CCD camera, etc.), output devices (e.g., a display screen, audio speakers, etc.), benefit output devices (e.g., a coin tray or printer for printing cashless gaming tickets), combinations thereof (e.g., a "ticket-in/ticket-out" device, a touch-sensitive display screen, etc.), communications ports, and so on. Thus, a kiosk 110 may comprise many of the features and components of a gaming device 102, though the kiosk itself may not necessarily be configured to enable gambling activity as a primary function. A kiosk may communicate with any or all of (i) a gaming server 106, (ii) a gaming device 102, (iii) an inventory/reservation system of a casino-maintained property (e.g., a hotel), (iv) casino personnel devices, (v) merchant POS terminals, and so on. A number of kiosks 110 may be stationed within casino premises (e.g., at various locations on a slot floor).

In various embodiments, kiosks may execute or assist in the execution of (i) determining and outputting a player status or other types of data described herein (e.g., a kiosk receives a player tracking card, and outputs a number of accumulated reward which a player may be entitled to redeem), (ii) outputting payments to players (e.g., upon receipt of cashless gaming tickets, player tracking cards, smart cards, etc.), and/or (iii) any other process described herein. Thus, such a device may be configured to read from and/or write to one or more databases of the present invention. The memory of such a device may store a program for executing such processes.

The kiosk 110 may be available for allowing a player to customize the gaming experience or cash out game winnings. The kiosk 110 may also be available to the player for purchasing flat-rate gaming sessions, purchasing goods and services with player loyalty points, registering for a player of loyalty program, etc.

The gaming devices 102, the kiosk 110, and the peripheral device server 112 as well as all other network devices 101 are in communication with the gaming server. The gaming server 106 will now be described in detail with reference to FIG. 1. Like the gaming device 102, the gaming server 106 has a central processing unit CPU 115. The server executes the instructions of a program 117 stored in Read Only Memory (ROM) 116 and executed from Random Access Memory RAM 118. Additionally, the CPU 115 is coupled to a data storage device 124, having a plurality of databases.

In order to communicate with gaming devices 102 and/or another device, the gaming server 106 also includes a communication port. The communication port connects the server CPU 115 to the gaming device 102. Thus, the CPU 115 of the gaming server 106 can control the communication port to receive information from the data storage device 124 and transmit information to the gaming device 102 and vice versa.

The player database 144 may serve as one example of the communication capability of the communication network 104 to exchange data between the gaming server 106 and the gaming device 102. The player database 144 may be used to store data associated with specific players that are members of a gaming establishment's player loyalty program. These programs reward players with complementary points as players wager on the gaming establishments gaming devices. These loyalty points are generally redeemable for gifts and other discounts on goods and services, especially those offered by the gaming establishment.

The player database 144 may store player wagering data that can be converted into loyalty points and accumulated in the player's account. As will be described in detail below, in one embodiment, the gaming device 102 communicates player identifying information to the gaming server 106. The gaming server 106, in turn, verifies the player identifying information. This identification then allows the server to collect statistical data regarding the player's game play (e.g., wagering activity).

The player database 144 may alternately or additionally store various other data associated with a player, such as the type of game or machine a player is currently playing or has played, the length of time a player has played a certain game or machine, information regarding wins and losses (e.g., total amount won/lost for a given period of time, consecutive wins/losses, percentage of all plays that are wins/losses, etc.), and so on; such data may be used with respect to some embodiments (e.g., a first player elects to wager on a second player's game results if the second player has won a certain amount within a given time).

The player database 144 may also contain other information that may be useful for satisfying player needs (e.g., information about the player's gaming preferences (such as which games the player prefers and/or under what conditions the player prefers to switch from one game to another), gaming sessions, outstanding debts, lodging arrangements, and the like). For example, the player database 144 may store data regarding a given player's standing in a game session or bonus game, so that the player can continue the game session or bonus game at one of a plurality of gaming devices that have common access to the player database 144.

Player data may be stored in a relational database and retrieved or otherwise accessed by the CPU 115 after receiving a "key" data point from the player, such as a unique identifier read from the player's player-tracking card or cashless gaming ticket, PIN or code entered by a player using an input device of the gaming device 102, etc. It is contemplated that players may also identify themselves in a variety of other manners, such as by providing biometric identifiers, RFID identity devices, etc.

The player database 144 of the present embodiment may include multiple records having multiple fields of information. For example, turning to FIG. 7, an example of a player database 144 (FIG. 1) is illustrated. The player database 700 comprises multiple records, each record being associated with a particular player, as identified by a player identification (ID) number 710. The fields within each record include player identification (ID) number 710, Social Security number 712, name 714, address 716, telephone number 718, credit card number 720, credit balance 722, accumulated complimentary points 724, whether the player is a hotel guest 726, and player status rating 728. Having information related to one field, such as player ID 710, allows the gaming server 106 to retrieve all information stored in corresponding fields of that player record.

Various systems for facilitating such monitoring are contemplated. For example, a two-wire system such as one offered by International Gaming Systems (IGT) may be used. Similarly, a protocol such as the IGT SAS™ or SuperSAS™ protocol may be used. The SAS™ and SuperSAS™ protocols allow for communication between gaming machines and slot accounting systems and provide a secure method of communicating all necessary data supplied by the gaming device to the online monitoring system. One aspect of the SAS™ and SuperSAS™ protocols that may be beneficial in implementing aspects of the present invention are the authentication function which allow operators and regulators to remotely interrogate gaming devices for important memory verification information, for both game programs, and peripheral devices. In another example, a one-wire system such as the OASIS™ System offered by Aristocrat Technologies™ or the SDS slot-floor monitoring system offered by Bally Gaming and Systems™ may be used. Each of the systems described above is an integrated information system that continually monitors slot machines and customer gaming activity. Thus, for example, any one of these systems may be used to monitor a player's gaming activity in order to determine player outcomes, coin-in statistics, win/loss statistics and/or any other data deemed relevant.

Turning back to FIG. 1, the gaming network 100 may have a data storage device 124 for storing the player database 144 as well as storing other types of data in a number of databases. Examples of such databases include, but are not limited to, (i) a network configuration database 147 that stores information related to one or more network devices 101 with which the gaming server 106 is operable to communicate, (ii) a games database 146 that stores game software for a plurality of games playable on and/or downloadable to one or more gaming devices 102, (iii) a parameters database 145 for storing game play related parameters, (iv) a player database 144 to store player data, and (iv) a reconfiguration database 148 for determining conditions under which game play is altered including instructions for altering game play.

It is to be understood that because the gaming devices 102 are in communication with the gaming server 106, information stored in a gaming device 102 may be stored in the gaming server 106 and vice versa. Thus, for example, in an alternate embodiment, the gaming device 102, rather than the data storage device 124 may store one or more of these databases. In other embodiments, some or all of these databases may be partially or wholly stored in another device, such as in a peripheral device server 112, kiosks 110, the gaming server 106, other gaming devices 102, etc.

It will be understood by one of ordinary skill in the art that (i) alternative database structures to those described herein may be readily employed; and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown.

Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes described herein. In addition, the databases may, in a known manner, be stored locally or remotely from a device, that accesses data in such a database.

With the communication network 104 and access to data from the data storage device 124, the gaming server 106 may be operable to configure (or reconfigure) a gaming device 102 remotely, update software stored on a gaming device 102 and/or to download software or software components to a gaming device 102. For example, a database (e.g., a payout or probability database) stored in the memory of gaming device 102 may be altered, modified, or updated remotely, hot fixes may be applied to software stored by the gaming device 102, and/or new versions of software may be downloaded to the gaming device. Similarly, the gaming device 102 may be programmed to retrieve any or all such updates from another device.

Gaming server 106 may be programmed (e.g., with program 117) to perform any or all of the above functions based on, for example, an occurrence of an event (e.g., a scheduled event), satisfying a condition, receiving an indication from a qualified casino employee and/or other person (e.g., a regulator), receiving a request from a player, and/or the satisfaction of a condition stored in a reconfiguration database 148.

The capability of the gaming server 106 to reconfigure the gaming device 102 can be extended to reconfiguring a gaming device 102 when a predetermined condition is satisfied. In this embodiment, the gaming device 102 essentially comprises a thin client device controlled by the gaming server 106. The gaming server 106 may determine game outcomes for each of the gaming devices 102 and download those game outcomes (including associated graphics and audio data in some embodiments) to the gaming device 102. Multiple instances of the same game may be downloaded to different players on different gaming devices (i.e., the same game on the server 106 may be producing different game outcomes for different players playing at the same time at different gaming devices).

Figure 2:
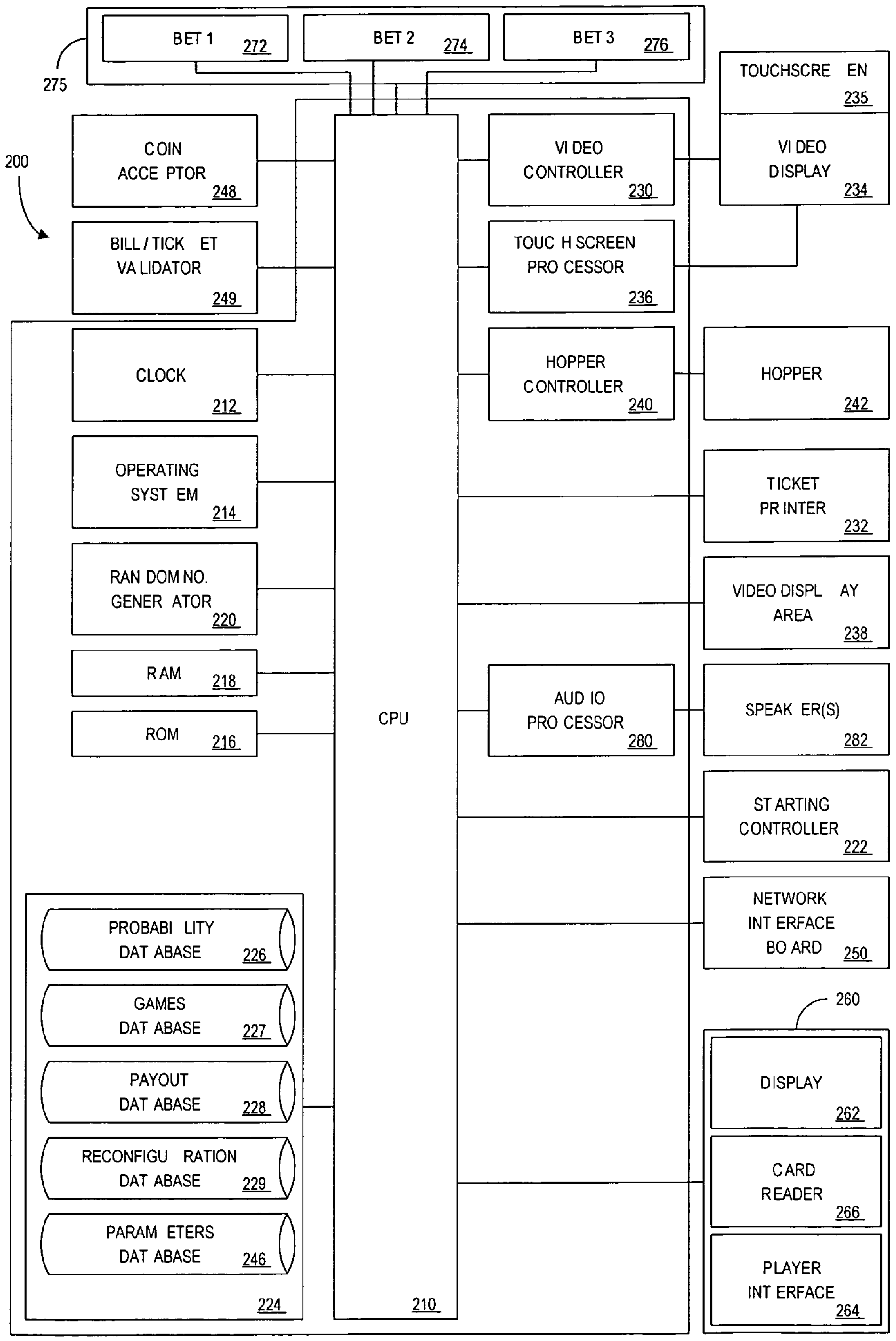
FIG. 2 is a schematic view of the gaming device of FIG. 1.

Referring now to FIG. 2, illustrated therein is one embodiment of a gaming device 200. The gaming device 200 may be an embodiment of a gaming device 102 shown in FIG. 1. The gaming device 200 has a CPU 210, which is communication with the communication network 104 of FIG. 1 through a network interface board 250. The network interface board 250 provides a communication path from the gaming device 200 to gaming server 106 through the gaming network 100. Thus, as discussed in detail below, information can be communicated between the gaming device 200 through its CPU 210 to the gaming server 106. In addition, the player-tracking device 260 and its associated player interface 264 (e.g., keypad) which is also in communication with the gaming device's CPU 210, may provide a communications link between the player and the gaming device 200 or even the gaming server 106 through the gaming device's 200 CPU 210.

It should be noted that although the gaming device 200 communicates with the server 106, such communication is not necessary to reconfigure the gaming device in response to satisfying a predetermined condition. However, such communications may be useful for augmenting standard gaming device data processing functions such as accounting and player-tracking.

With respect to gaming operations, the gaming device 200 operates in a conventional manner. The player starts the gaming device 200, for example, by inserting a coin into the coin acceptor 248 or a bill into the bill validator 249. A starting controller 222 may initiate operation of the gaming device 102 to produce a random game outcome.

The gaming device 200 contains a Central Processing Unit (CPU) 210 that executes instructions of a program 214 stored in Read Only Memory (ROM) 216 for playing the gaming device 200. The CPU 210 performs instructions of the program 214 and thereby operates to perform in accordance with the methods described in detail herein. The program 214 may be stored in a compressed, uncompiled, and/or encrypted format. The program 214 furthermore includes program elements that may be necessary, such as an operating system, a database management system and "device drivers" for allowing the processor to interface with computer peripheral devices.

According to one embodiment, the instructions of the program may be read into a main memory (e.g., Random Access Memory (RAM) 218) from another computer-readable medium such as from a ROM 216. The system bus carries the data to main memory, from which the CPU 210 retrieves and executes the instructions. The instructions received by main memory may optionally be stored in memory either before or after execution by the CPU 210. RAM 218 may also temporarily store information communicated to it by the CPU 210 during game play.

Execution of sequences of the instructions in program 214 causes CPU 115 to perform the process steps described herein. In alternate embodiments, hard-wired circuitry may be used in place of, or in combination with, software instructions for implementation of the reconfiguration process. Thus, the various embodiments are not limited to any specific combination of hardware and software.

The CPU 210 and the memory 216 and 218 may each be, for example: (i) located entirely within a single computer or other device; or (ii) connected to each other by a remote communication medium, such as a serial port cable, telephone line, or radio frequency transceiver. In one embodiment, the gaming device 200 may comprise one or more devices that are connected to a remote server for maintaining databases.

Under control of a program stored, for example ROM 216, the CPU 210 initiates the RNG 220 to generate a random number. The random number generator 220, in accordance with at least one embodiment, may generate data representing random or pseudo-random values (referred to as "random numbers" herein).

The random number generator 220 may generate a random number, for example, every predetermined unit of time (e.g., every thousandth of a second) or in response to an initiation of a game on the gaming device 102. In the former embodiment, the generated random numbers may be used as they are generated (e.g., the random number generated at substantially the time of game initiation is used for that game) and/or stored for future use. A random number generated by the random number generator 220 may be used by the CPU 210 to determine, for example, at least one of an outcome and payout.

A random number generator 220, as used herein, may be embodied as a secondary processor, separate from but working in cooperation with the CPU 210. Alternatively, the random number generator 220 may be embodied as an algorithm, program component, or software program stored in the memory of the gaming device 200 and used to generate a random number. Note that, although the generation or obtainment of a random number is described herein as involving a random number generator 220 of a gaming device 200, other methods of determining a random number may be employed.

For example, a gaming establishment may obtain sets of random numbers that have been generated by another entity. For example, there are services that provide random numbers that have been generated by timing successive pairs of radioactive decays detected by a Geiger-Muller tube interfaced to a computer.

As would be understood by one of ordinary skill in the art, a random number generator 220 may be stored in a device other than a gaming device 200. For example, in some embodiments, a gaming device 200 may receive random numbers and/or any other data related to the random or pseudo-random determination of an outcome from a separate device, such as the gaming server 106 shown in FIG. 1. In fact, the gaming server 106 (and/or the data storage device 124) may contain not only the random number generator 220, but also the probability and pay table databases necessary to determine a winning game outcome, and the payout award for such a winning game outcome. This arrangement might be implemented in a thin-client type gaming device (i.e., a dumb terminal or smart-enough terminal).

It should be noted that such embodiments may be advantageous in environments or jurisdictions wherein the "central determination" of outcomes is required by regulation or otherwise preferred. Thus, for example, outcomes may be determined centrally by a game server, and then propagated (e.g., electronically) such that indications of the outcomes may be viewed using one or more gaming devices (e.g., "Class II" gaming devices, "thin-client" gaming devices in a server-based "Class III" gaming architecture, Video Lottery Terminals, and so on).

The CPU 210 as shown in FIG. 2 looks up the generated random number in a stored probability database 226, which contains a list that matches random numbers to corresponding game outcomes to determine a game outcome based on the generated random number.

A probability database 226 may be stored in the gaming device's 200 ROM 216 or in any other data storage device. The data stored therein may include a number of exemplary records or entries, each defining a random number. Those skilled in the art will understand that the probability database may include any number of entries. The tabular representation may also define fields for each of the entries or records. The fields may specify: (i) a random number (or range of random numbers) that may be generated by the random number generator 220; and (ii) an outcome that indicates the one or more indicia comprising the outcome that corresponds to the random number of a particular record. These indicia comprise the game outcome that is then displayed to the player in the primary video display 234.

The indicia representing the game outcome may comprise cards from a card deck displayed on the video display on a video poker gaming device. For example, the book "Winning at Slot Machines" by Jim Regan (Carol Publishing Group Edition, 1997) illustrates examples of payout and probability tables and how they may be derived. The entirety of this book is hereby incorporated by reference herein for all purposes.

Based on the identified game outcome, the CPU 210 locates the appropriate payout in a stored payout database 228. The payout database 228 may be stored in the gaming device's 200 RAM 218 (alternatively, the payout database may also be stored in any other data storage device).

A payout database 228 may store a number of entries associated with each possible game outcome represented by the indicia determined by the probability table. The tabular representation defines fields for each of the entries or records. The fields specify: (i) an outcome, which indicates the one or more indicia comprising a given outcome, and (ii) a payout that corresponds to each respective outcome. The outcomes may be those obtained from winning game outcomes typically obtainable on a video poker gaming device (e.g., royal flush, straight flush, straight, four-of-a-kind, full house, two pair, three-of-a-kind, and pair). With the payout database 228, the payout amount of any winning game outcome can be determined.

The described entries of the probability database 226 and the payout database 228 represent exemplary information only; those skilled in the art will understand that the number and content of the entries can be different from those illustrated herein. Further, despite any description of the databases as tables, an object-based model could be used to store and manipulate the data types and likewise, object methods or behaviors can be used to implement the processes described herein.

In addition to determining a game outcome, the CPU 210 controls a variety of peripheral devices associated with the gaming device that may be used to assist the player in making wagers and receiving payouts. The CPU 210 is operable to communicate (e.g., via a protocol such as GDS) with these various peripheral devices associated with the gaming device 102.

The following is a description of some of these peripheral devices that are available in gaming devices 200. These peripheral devices may be classified as either input devices (e.g., player to gaming device), output devices (e.g., gaming device to player), or interface devices that have both input and output type characteristics. It should be understood that not all of the peripheral devices are necessary, and further, that the peripheral devices may be used in any combination, including using a plurality of the same peripheral device in a single gaming device 200.

Some examples of input devices include wager acceptors, for initiating game play on the gaming device 200, such as the coin acceptor 248. A coin acceptor 248 is coupled to the CPU 210. Each coin received by the coin acceptor 248 is registered by the CPU 210. A hopper controller 240 is connected to a hopper 242 for dispensing the collected coins when a winning game outcome occurs. In addition, when the player requests to cash out by pushing a cash out button (not shown) on the gaming device 200, the CPU 210 checks the RAM 218 to see if the player has any credit and, if so, signals the hopper controller 240 to release an appropriate number of coins into a payout tray (not shown).

Another type of wager acceptor is the bill/ticket validator 249. The bill/ticket validator accepts either paper currency or ticket vouchers. This ticket voucher operates similar to cash and is generally accepted by most gaming devices 200 in the gaming establishment with a bill/ticket validator 249.

The voucher is printed by a ticket printer 232 located in the gaming device 200. For example, when a player cashes out, instead of accepting payment in coin, the player may request a ticket voucher. The credit balance on the credit balance meter of the gaming device 200 is indicated on the ticket voucher. The ticket voucher generally contains a barcode and other legible indicia that indicates the gaming establishment and the monetary value of the voucher.

The barcode on the voucher is machine-readable by the bill/ticket validator 249. The player simply inserts the voucher (as the player would for paper currency) into the bill/ticket validator 249 and the value of the voucher is determined. The gaming device 200 communicates with a gaming server 106 (shown in FIG. 1) that manages the accounting associated with such ticket-in/ticket-out transactions (e.g., to track the issuance, redemption and expiration of such vouchers). An example of such ticket-in/ticket-out technology, the EZ PAY system, is manufactured by International Gaming Technology, headquartered in Reno, Nev. The monetary value of the voucher is displayed on the gaming device's credit meter and is available for wagering. Other forms of payment may be available including the use of credit cards, debit cards, etc. to make wagers.

Also in communication with the CPU 210 is a player-tracking device 260. The CPU 210 is in turn in communication with a server 106 (shown in FIG. 1) that contains the player database 144. The player-tracking device 260 has a card reader 266 as shown in FIG. 2, which accepts a player-tracking card for reading player-identifying information stored on a player-tracking card (e.g., a player identification (ID) number). Although not so limited, the player-tracking card of the present embodiment stores the player ID on a magnetic strip located thereon. Alternatively, any player identifying indicia may be used, including biometric indicia.

The player-tracking device 260 has a player-tracking display 262 and a player interface 264 that allows the gaming device 200 and/or server 106 to communicate with the player. The player interface 264 may include a keypad and/or a touch-screen display. The player-tracking device 260 may be used to not only track player wagering, but also used to specify conditions and instructions for the reconfiguration of gaming device 200.

Other examples of input devices that facilitate game play include the pushbutton panel 275. The pushbutton panel 275 allows the player to make various choices including wager amounts and games selections. The gaming device 200 also includes a series of bet buttons 272, 274, 276. The bet buttons include "Bet 1 coin" 272, "Bet 2 coins" 274, and "Bet 3 coins" 276. The bet buttons 272, 274, 276 are coupled to the CPU 210. Therefore, pressing one transmits a signal to the CPU 210 indicating how much a player is wagering on a given play. Other examples of input devices include keypads, microphones, video camera, etc. may be in communication with the CPU 210 or with the player-tracking device 260.

The CPU 210 may also be operable to communicate with various output devices. In some embodiments, an output device comprises a game display. The primary video display 234 may comprise, for example, one or more display screens or areas for outputting information related to game play on the gaming device 200, such as a cathode ray tube (CRT) monitor, liquid crystal display (LCD) screen, and/or light emitting diode (LED) screen.

In one or more embodiments, a gaming device 200 may comprise more than one game display. For example, a gaming device 200 may comprise an LCD display for displaying electronic reels (or card hands in the case of a video poker gaming device) (e.g., a primary video display 234) and a display area that displays rotating mechanical reels.

Alternately, a gaming device 200 may have a video display 234 for the outcome of a primary game played on the gaming device and a secondary video display 238 may display rules for playing a game of the gaming device, the outcome of secondary games played in conjunction with the primary game, and various other games being offered to a player (e.g., a selectable list of the "top 10" games in terms of coins paid out in the past hour is constantly refreshed and displayed in a secondary area).

The CPU 210 may also be in communication with one or more other output devices. Such devices may comprise, for example, a primary video display 234 through a video controller 230, an audio speaker 282 through an audio processor 280; headphones; an infrared transmitter; a radio transmitter; an electric motor, etc. The CPU 210 may also be in communication with a wireless handheld gaming device 120 (shown in FIG. 1) that may receive in some embodiments game outcomes from gaming device 200.

Another type of output device is required to pay off winning game outcomes. For example, the coin hopper 242 may pay out coins from the gaming device or a ticket voucher may be provided for a winning game outcome. In yet another example, the gaming device 200 may credit a monetary amount to a financial account (not shown) associated with a player as a pay out provided to a player. The financial account may be, for example, a credit card account, a debit account, a charge account, a checking account, or a casino account (e.g., an account from which the player may access cashable and/or non-cashable funds using a player tracking card or smart card).

A gaming device 200 may also include a touch screen 235 and a touch screen processor 236 associated with a primary video display 234. The touch screen 235 and touch screen processor 236 may be operable to communicate with a video controller 230 of the primary video display 234 and a CPU

210. Thus, a player may be enabled to indicate decisions or choices by touching the touch screen 235 in the appropriate places.

The primary video display 234 may operate in conjunction with the video controller 230 in the CPU 210 to produce multiple separate images on the gaming device 200. Each of these separate images may originate from a separate and independent video signal. This provides significant flexibility in using a single primary video display 234 to display a plurality of separately and independently acquired images.

For example, turning to the gaming network flow diagram of FIG. 1, each image may be acquired from a separate gaming device 102 on the gaming network 100 as shown in the flow diagram of FIG. 1. As a result, the player is able to simultaneously view the operation of a plurality of gaming devices 102 in real-time. These images, for example, may be "screen shots" of the game outcomes received on these gaming devices 102. In addition to the images acquired from gaming devices 102 in the gaming network 100, the gaming device 102 that displays the plurality of images may also display its own game outcomes. These screen shots may be provided in real-time or on a live basis.

Figure 3:
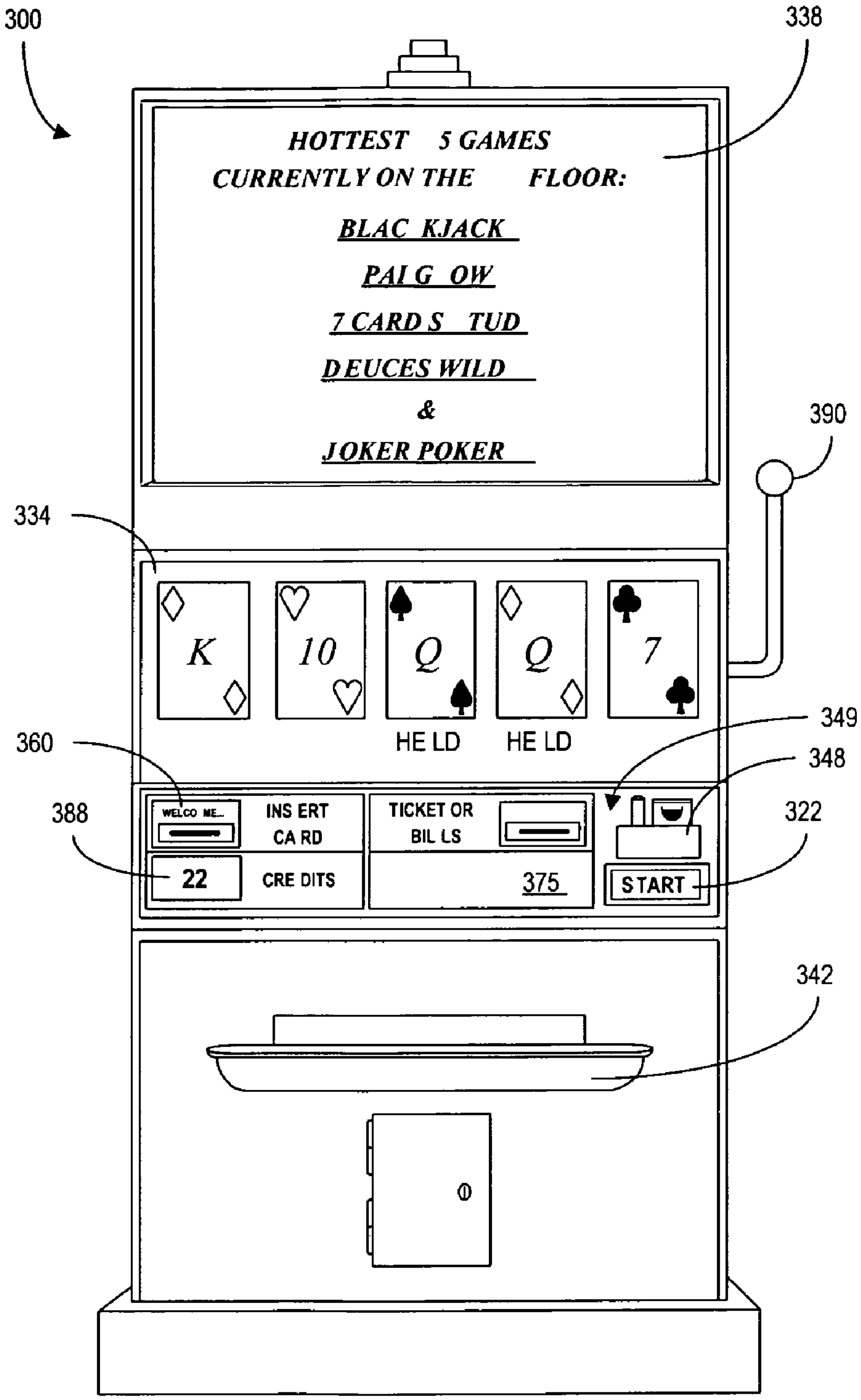
FIG. 3 is an orthographic view of the gaming device of FIG. 1.

Turning to FIG. 3, an orthographic view of a gaming device 300 is presented, in accordance with one example embodiment. The gaming device 300 may comprise, in one embodiment, for example, gaming device 200 (FIG. 2) and/or a gaming device 102 (FIG. 1). A number of peripheral components are visible on the gaming device 300 and are explained below from the view of a wagering player.

A gaming device 300 may comprise a display area in which a game outcome is displayed to the player. The display area may, for example, be a video display 338 that displays graphical representations of reels or other indicia used to indicate a game outcome. The display area may, in another example, be glass behind which are located mechanical reels.

A player desiring to wager on gaming device 300 may first present a player-tracking card to the player-tracking device 360 associated with gaming device 300 to accrue player loyalty points. The gaming device 300 has two wager acceptors—a coin acceptor 348 and a bill/ticket acceptor 349. The wager is registered on the credit meter 388. Once a wager has been placed, the player can start the gaming device 300 with the pull handle 390. The game outcome is shown on the primary video display 334.

Figure 10:
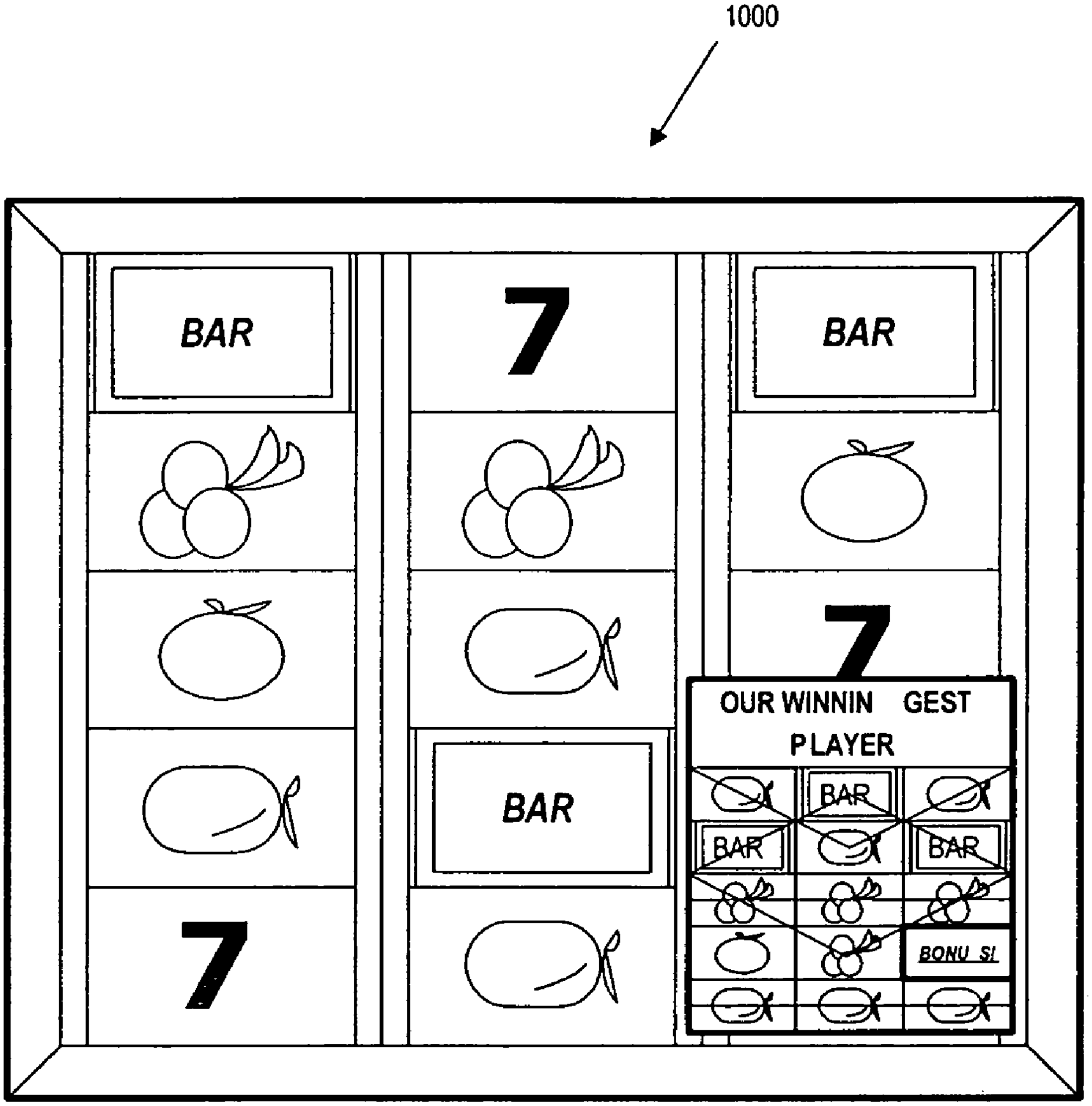
FIG. 10 is an example of a picture-in-a-picture display provided on a video display for displaying game outcomes from associated gaming devices, offers, and other information.

A secondary video display is also available to present additional player or game information. To increase the display capability of the gaming device 300 even further, video display 334 and/or 338 may be configured to provide a plurality of separately and independently obtained video images on a single video display. An example of such a technique is commonly known as picture-in-a-picture 1000 as shown in FIG. 10. Pictures may overlap or be displayed separately. Some images may be ghosted or semi-transparent and overlap. Overlapped images may form a single image.

In other gaming device 300 embodiments, the primary video display 334 may be a set of mechanical reels to display a game outcome.

Finally, the slot machine may comprise a coin tray 342. Payment to the player may be rendered by dispensing coins into the coin tray. Such coins may be dispensed based on, for example, a player's indication that the player would like to cash out his credit meter balance and/or a payout obtained by a player as a result of playing a game on the gaming device 300.

Reconfiguration

The communication network 104 of FIG. 1 allows any combination of database structures in either the gaming server 106 or the gaming device 102 to be implemented to effect the reconfiguration of the gaming device. For example, turning to FIG. 1, the gaming server 106 may trigger the reconfiguration of gaming device 102 based on the parameters database 145 and the reconfiguration database 148 through the communication network 104. The server 106, in some embodiments, may act to reconfigure a gaming device 102 by accessing databases in the data storage device 124 to monitor the status of parameters and determine the validity of active conditions that may trigger reconfiguration.

If the triggering condition is satisfied, the gaming server 106 implements the reconfiguration to alter game play. When the reconfiguration is triggered, the gaming device 102 is instructed by the server 106 to reconfigure in a specified matter. The gaming device 102 receives the instruction from the server 106 and either automatically implements the game for the player, or offers the player an opportunity to accept or reject (or even ignore) the reconfiguration offer. To ensure timely implementation, the gaming server 106 may update the parameters database 145 continuously, collecting data from both gaming devices 102 and players, to insure that when specified conditions are satisfied, instructions to change game play are triggered.

The gaming server 106 may also be available to configure a gaming device 102 to receive game outcomes from another gaming device in the gaming network 100. Furthermore, the gaming server 106 may have the capability to locate a particular player on a gaming device 102, determine the game outcomes received by the player on that gaming device, and provide these game outcomes to another player on a different gaming device.

All of the above methods to receive game outcomes from a variety of gaming devices 102 on the gaming network 100 demonstrate the capability of the gaming server 106 in conjunction with the communication network 104 to implement gaming device reconfiguration.

Alternatively, the gaming device 102 in the gaming network 100 shown in FIG. 1 may be implemented with the database configuration shown in the block diagram of FIG. 2. The gaming device 200 in this embodiment does not require the support of gaming server 106 to trigger the reconfiguration of the gaming device. For example, one or more embodiments may be practiced on a stand-alone gaming device 200. In such an embodiment, any functions described as performed by the gaming server 106 or data described as stored on the server may instead be performed or stored on the gaming device 200. In another embodiment, the gaming device 200 may be part of a gaming network, but still trigger and control the reconfiguration process.

The databases required for reconfiguration stored in the data storage device 124 and accessible to the gaming server 106 in one embodiment shown in FIG. 1 may need to be accessed by a standalone gaming device. To be independent of the gaming server 106, these databases may be stored in the gaming device 200 (e.g., the data storage device 224) as shown in FIG. 2. In addition to the probability database 226 and the payout database 228, the reconfiguration database 229 and the parameters database 246 may be stored in the gaming device 200 to implement reconfiguration. This allows gaming device 200 as shown in FIG. 2 to trigger the reconfiguration, separately and independently of the gaming network of FIG. 1. Of course, as described above, any or all of the databases described herein may alternately or additionally be stored by server 106.

The gaming device 200 may monitor a set of parameters that may be used to validate the predetermined condition. For example, a parameters database 246 may be maintained by the gaming device 200 (and/or server 106) to record game play statistics. This database is continuously updated to track values of specific parameters occurring with respect to the gaming device 200, other gaming devices, players, and other events occurring on the gaming network 100. These parameters may be represented as values, such that a reconfiguration of the gaming machine 200 can be triggered based on the satisfaction of a predetermined condition (e.g., a parameter reaches a certain value such as 10 consecutive wins occur on a second gaming machine).

These tracked parameters may be either specific to the gaming device 200 or specific to other gaming devices on the gaming network 100, specific to one more players currently playing, are specific to other network devices 101 on the gaming network 100. The statistics may include win/loss ratios, maximum consecutive games lost, wager amounts, speeded game play, etc.

A reconfiguration database 229 may also be maintained to store the conditions and instructions for changing game play. The reconfiguration database 229 includes a condition that triggers the implementation of an instruction (for reconfiguring a gaming device). Conditions may be satisfied when specified parameters validate the condition (e.g., when parameters reach certain values).

Figure 8:
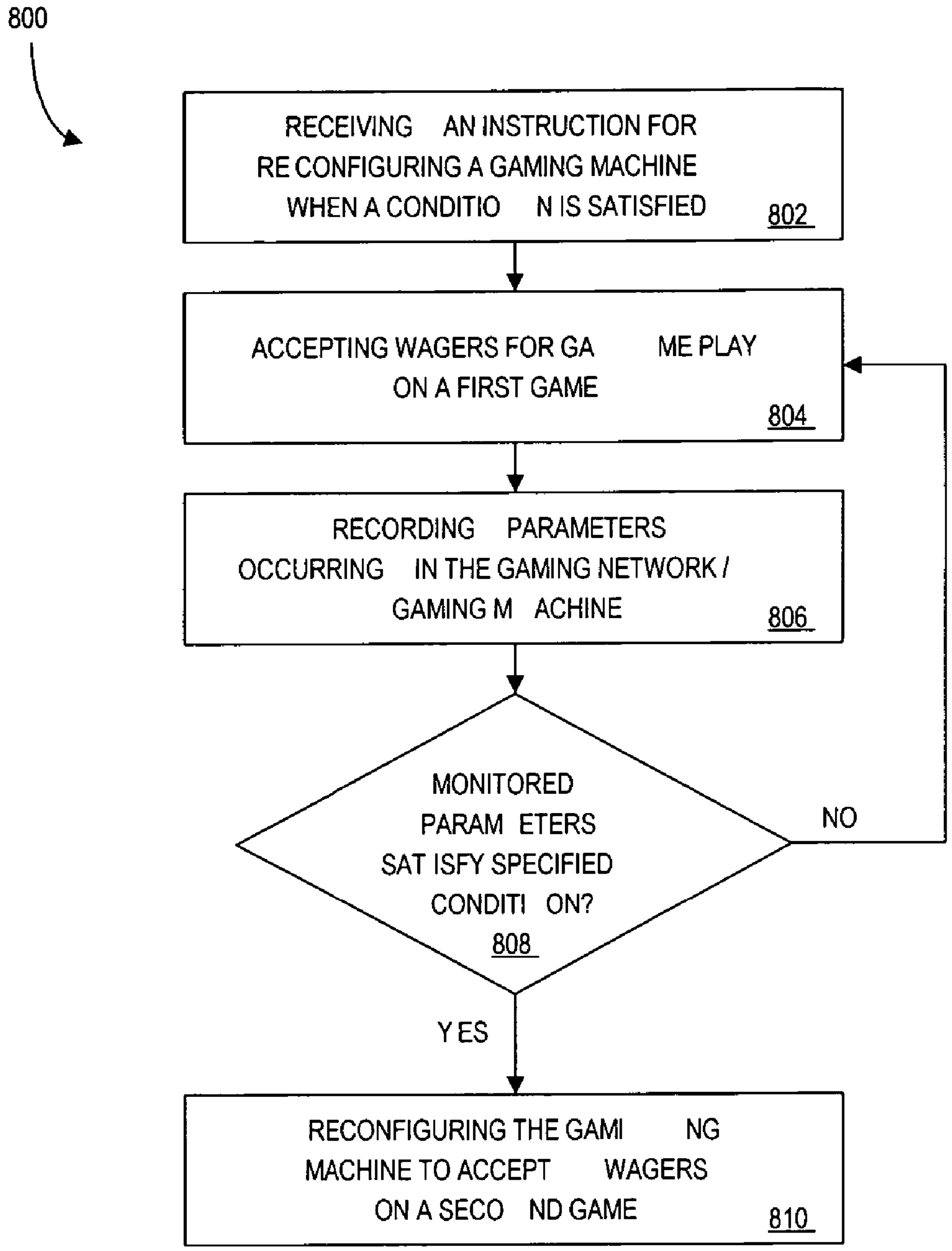
FIG. 8 is a flow chart of one embodiment of the process for triggering reconfiguration of a gaming device to alter game play.

Turning to FIG. 8, an automatic reconfiguration flow chart 800 is provided that illustrates the overall process flow of one exemplary embodiment of the reconfiguration process. The process of FIG. 8 may be applied, in one embodiment, to the gaming network 100 of FIG. 1 to illustrate the process flow in relation to the network devices 101. In this embodiment, a parameters database 145 may be maintained and updated as game play on the gaming network 100 or gaming device 102 occurs. These parameters may be used to validate the occurrence of a condition. An instruction may be received or stored in the gaming device 102 (or any other network device 101) to change game play on the gaming device 102 on the validation of a condition in step 802. This instruction may be received from the player or may be preprogrammed into the gaming device 102 or server 106. Game play commences with a first game on a gaming device 102 with the acceptance or recognition of a wager in step 804. The gaming network 100 monitors and updates parameters in step 806. A determination is made whether the updated parameters satisfy the predetermined condition in step 808. If the condition is satisfied, the gaming device 200 is reconfigured to alter game play to accept wagers on a second game per the instruction in step 810. Otherwise, game play continues at step 804.

Figure 9:
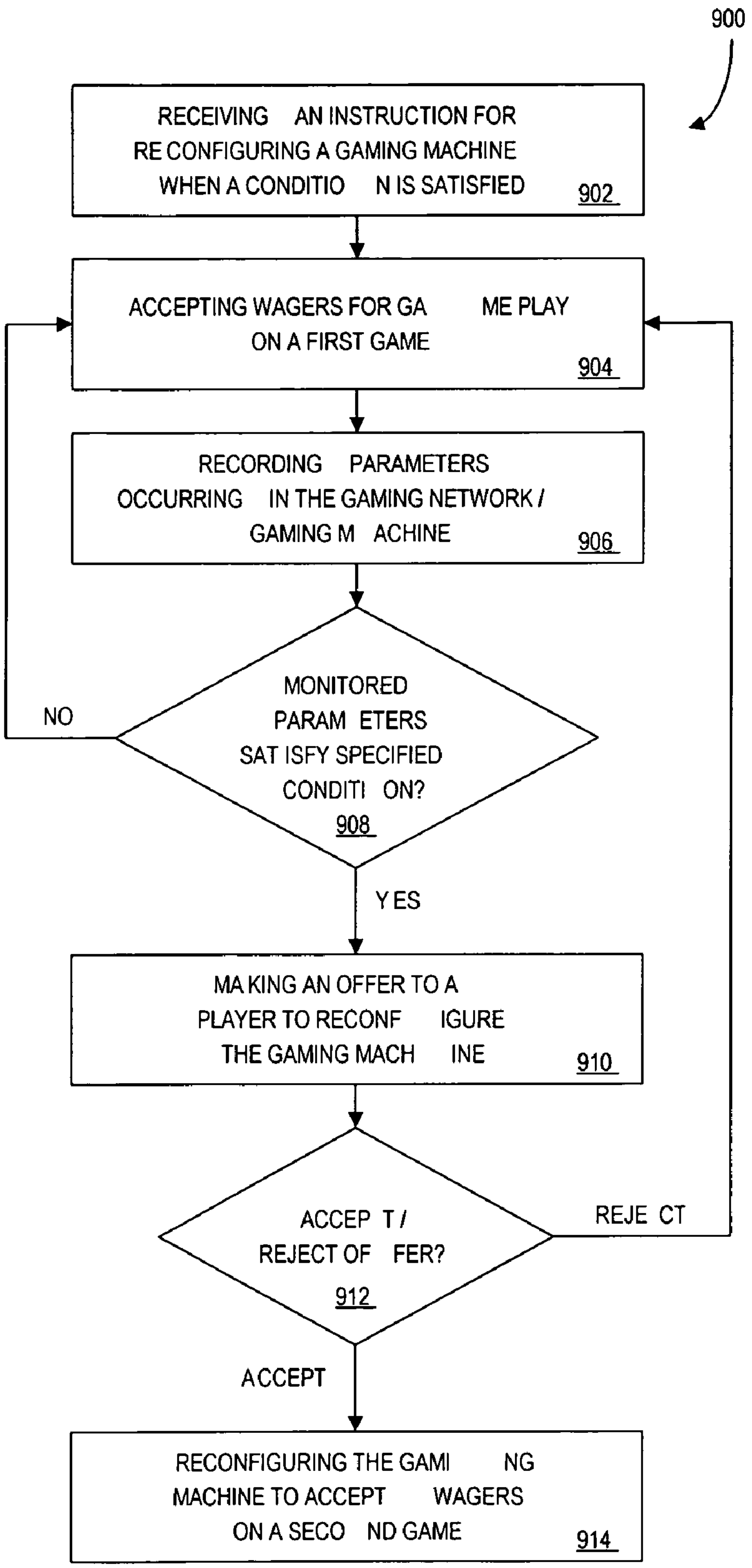
FIG. 9 is a flow chart of one embodiment of the process for triggering reconfiguration of a gaming device after accepting an offer to alter game play.

Turning to FIG. 9 in conjunction with FIG. 1, an alternate embodiment of the above flow process is illustrated that includes an additional step that provides a player with an offer to reconfigure the gaming device 102. Again, in one embodiment, a parameters database 145 may be maintained and updated as game play on the gaming network 100 or gaming device 102 occurs. These parameters may be used to validate the occurrence of a condition. An instruction may be received or stored in the gaming device 102 (or any other network device 101) to change game play on the gaming device 102 in step 902. This instruction may be received from the player or may be preprogrammed into the gaming device 102 or server 106. Game play commences with a first game on a gaming device 102 with the acceptance or recognition of a wager in step 904. The gaming network 100 or gaming device 102 monitors and updates the parameters recorded in step 906. A determination is made whether the updated parameters satisfy the predetermined condition in step 908. If the condition is satisfied, an offer is made to the player to reconfigure the gaming device 102 in step 910. The player may either accept or decline the offer in step 912. If the player declines the offer in step 912, game play continues on the first game in step 904. If the player accepts the offer in step 912, the gaming device 102 is reconfigured for the second game in step 914.

With a basic understanding of a gaming device (e.g., a gaming device 200 and/or a gaming device 300) and the gaming network 100 in which it operates, the process generally described above is explained in further detail, including various embodiments for automatically changing game play, or providing an offer to change game play, when predetermined conditions are satisfied can be discussed.

Altering Game Play

As noted above, instructions determine the type of reconfiguration that occurs when a condition is satisfied. Instructions for reconfiguring gaming devices and/or conditions upon which such reconfigurations are to occur may be entered/selected by a player or operator by using a gaming machine 200, a server 106, or computing device in commutation there with (e.g., an operator uses a personal computer device in communication with a server to select/activate instructions and/or conditions), a kiosk, and so on. In some embodiments, instructions and conditions may be selectable from a list or menu of available instructions and conditions. Thus, in some embodiments, a player or operator may select/activate desired instructions and conditions from such a list or menu (e.g., populated by accessing a reconfiguration database 229). In some embodiments, a player/operator may select a type of instruction or condition (e.g., instruction to switch to a second game, and a condition to switch to the second game when the second game achieves a number of consecutive wins), and then enter various desired values in association with the selected type of instruction or condition (e.g., the player uses an input device to specify a desired number of consecutive wins upon which the switch will occur).

These conditions may be satisfied when predetermined parameters validate the condition. In some embodiments, the parameters database 145 and the reconfiguration database 148 may be used together to determine when a parameter reaches a value that satisfies a condition that triggers the reconfiguration of the gaming device 102.

The player database 144 may also be used if desired in some embodiments to implement changes in game play when predetermined conditions are satisfied. In particular, the player database 144 may be used to store a player's instructions for triggering a reconfiguration as a result of satisfying a particular condition when a specified parameter is reaches a particular value (e.g., a particular game has paid out more than 1000 coins in the past 30 minutes). Alternately or additionally, reconfiguration database 229 may store any/all of such data.

The use of the player database 144 in certain embodiments may limit the application of reconfiguration to players participating in the player loyalty program. However, even this may be overcome by player-tracking registration techniques that allow players to quickly and anonymously become at least limited members of the loyalty program.

The discussion that follows details certain embodiments and examples of the types of parameters, conditions, and instructions that may be used in the triggering and reconfiguration of gaming devices.

Parameters

Parameters, in some embodiments, may represent data, statistics, values, or other information that may be tracked and stored in association with one or more gaming devices, types of gaming devices, games, types of games, players, etc. Thus, parameters may, in some embodiments, be considered when determining whether or not a condition is satisfied. For example, a database may store a variety of parameters, including a current number of consecutive losses associated with a gaming machine. Thus, in some embodiments, when determining whether a condition is satisfied (e.g., "A gaming machine achieves 10 consecutive losses"), a database of stored current parameters may be accessed (e.g., the database indicates that the gaming machine has achieved 9 consecutive losses, and therefore the condition is not satisfied, such that an associated instruction may not be performed).

Turning to FIG. 4, an example of a parameters database 400 in table form with exemplary entries is presented, in accordance with one embodiment. The parameters database may 400 comprise, for example, the parameters database 145 (FIG. 1) and/or the parameters database 246 (FIG. 2). Game play parameters 402 include any statistical or other information regarding game play that may be collected from a gaming device 102 or any network device 101 on the gaming network 100.

Because wagering entails considerable superstition and folklore, players often desire a specific game, gaming device, or player from which to receive game outcomes. Accordingly, players may find statistical or other information useful in helping them decide which games and gaming devices they would like to wager.

Parameters 402 may be used to form conditions that can trigger the reconfiguration of the gaming device 102. For example, the parameters database may contain the top five highest paying games, the top five highest paying gaming devices, or the most popular game by number of players, etc. Other potential parameters include the number of consecutive losses or consecutive winning game outcomes, loss to win ratio, financial return over a rate a time, financial return over a unit of time, rate of improvement in the financial return, improvement in the financial returned over a unit of time, the win to loss ratio, etc. Other parameters related to the financial success of a game, gaming device, or player that may trigger reconfiguration include the relative size of awards to wager amounts, recent performance compared to historical performance, types of winning game outcomes, etc. These parameters may then form the basis of various conditions that can trigger the reconfiguration of the gaming device.

Storage and updating of game play parameters 402 in a central database becomes particularly important and/or desirable in some embodiments (e.g., when the gaming establishment needs to provide game play statistical information to players regarding game play activity occurring throughout the game establishment). In one embodiment, the parameters database 145 and/or 246 may be used to track and store parameters 402 for multiple game types 404, machines 406, players, and different instances of the same game provided two different gaming devices from the server 106. In order to facilitate tracking of a plurality of gaming devices 102, such a database may be stored on the gaming server 106, or other suitable network device 101, to facilitate compilation of player and gaming device statistics.

Consequently, in some embodiments, it is desirable that the parameters database 146 be kept current and accessible to gaming devices 102 on the gaming network 100. Alternatively, parameters 402 used to validate conditions may alternately or additionally be tracked in a player database 144 to determine the validity of a specified condition. The development of conditions that, in some embodiments, use parameters to validate a condition are discussed below.

Conditions

A condition or reconfiguration condition, in some embodiments, is a condition that may stipulate one or more terms, which must be satisfied in order for a reconfiguration instruction to be executed. For example, a condition may be "A gaming machine achieves X consecutive losses". Thus, upon a gaming machine achieving X consecutive losses, an associated instruction may be performed (e.g., a type of game being played is changed from a first type to a second type).

Turning to FIG. 5, a reconfiguration database 500 is presented in tabular form with exemplary entries, in accordance with one example embodiment. The reconfiguration database may comprise, for example, the reconfiguration database 148 (FIG. 1) and/or the reconfiguration database 229 (FIG. 2). The reconfiguration database 500 lists conditions 512 that trigger an instruction 510 to reconfigure a gaming device 102, 200. Conditions 512 may include, for example, the speed of game play exceeding five game outcomes in a minute, wagering more than a dollar a minute, winning 100 dollars in a minute, total number of players currently playing exceeds a threshold, and percentage of all players currently playing exceeds a threshold, etc. Additional example conditions 512 are shown in FIG. 5 that may trigger an instruction 510.

Many players are interested in which games, which gaming devices, and/or which players are performing particular well. Other players are very interested in games, gaming devices, and/or players that are doing very poorly. Players often associate games/gaming devices/players as being "hot" who have obtained considerable wagering success. In contrast, players often associate games/gaming devices/players as being "cold" who have not obtained significant wagering success. In either case, different players will want to play hot or cold games or gaming devices; or receive game outcomes from hot or cold players. A list of conditions indicating cold and hot games are listed as follows.

A game my be considered "cold" when:

Game has paid out less than a threshold percentage of coin-in (wagers placed) for a duration of time or game plays (e.g., less than 50% of coin-in during past hour)

Game has paid out less than a threshold number of total coins for a duration of time or game plays (e.g., less than 10,000 coins in the last month)

Net loss amount (amount wagered minus amount won) exceeds threshold for a duration of time or game plays Game is currently being played by less than a threshold percentage of players on the floor (e.g., less than 5% of players on floor)

Game is currently being played by less than a threshold total number of players (e.g., less than 15 players)

More than threshold number of losing outcomes for a duration of time or game plays Less than threshold number of winning outcomes for a duration of time or game plays More than threshold number of consecutive losing outcomes e More than a threshold number of near misses (e.g. one card draws to flushes that are not successful)

Less than threshold number of consecutive winning outcomes

Less than a threshold number of bonus rounds for a duration of time or game plays Less than a threshold number of free spins for a duration of time or game plays Less than a threshold number of bonus events for a duration of time or game plays Percentage of all outcomes that are losses exceeds threshold for a duration of time or game plays Credit balance is equal to or lower than a threshold number Current credit balance is lower than a threshold percentage of buy-in amount A game may be considered "hot" when:

Game has paid out more than a threshold percentage of coin-in (wagers placed) for a duration of time or game plays (e.g., more than 100% of coin-in during past hour)

Game has recently paid a single payout of more than a threshold number of coins

Game has paid out more than a threshold number of total coins for a duration of time or game plays (e.g., more than 1,000 coins in the last hour)

Net win amount (amount wagered plus amount won) exceeds threshold for a duration of time or game plays Game is currently being played by more than a threshold percentage of players on the floor (e.g., more than 10% of players on floor)

Game is currently being played by more than a threshold total number of players (e.g., more than 30 players)

Less than threshold number of losing outcomes for a duration of time or game plays More than threshold number of winning outcomes for a duration of time or game plays Less than threshold number of consecutive losing outcomes More than threshold number of consecutive winning outcomes More than threshold number of bonus rounds or bonus events More than threshold number of successful long shot outcomes (e.g. completing a flush after drawing four cards)

Percentage of all outcomes that are wins exceeds threshold for a duration of time or game plays Speed of game play is very fast Credit balance is equal to or greater than a threshold number Current credit balance is equal to or greater than a threshold percentage of buy-in amount Game has recently been added to list of available games (e.g., "Switch me to new games as soon as they are available")

In addition to parameters for measuring hot and cold games, other parameters that may be measured include duration-based preferences. Some examples of these duration based preference conditions are as follows.

Duration-based preferences (not tied to hot/cold)

Total wagered exceeds threshold for a duration of time or game plays

Total number of game plays exceeds threshold

Total time spent playing game exceeds threshold (e.g., in a particular session, lifetime, etc.)

The reconfiguration of gaming devices may also be used by the gaming establishment to reinvigorate players who may become bored or dulled by the cost of play of a particular game. For example, a condition can be established that potentially indicates boredom. For example, the condition may include three different parameters such as: 1) time spent playing greater than 1 hour, 2) less than game plays initiated within 5 minutes, and 3) losing more than 5 dollars in 5 minutes.

In one embodiment, if it is determined that all three of these conditions are satisfied, it may be determined that an indication exists that the player is bored and the gaming machine may be reconfigured. The reconfiguration may provide the player with a new game, such as a bonus game, to increase player interest in the game by providing for example, free spins on the new game. Alternatively, if boredom is detected, an offer may be made to the player for a new game—potentially a game with more favorable payback percentages to increase player interest.

Other conditions that may trigger a reconfiguration of a gaming device may include those that are out of the player's control. These might include the player with the highest winnings for the night, tournaments sponsored by the gaming establishment, and even operational failures in network devices 101 (e.g., failure of the game server), or the utilization level of gaming devices and gaming devices in the gaming establishment (e.g., gaming device 102 operating at less than 50%).

Another type of condition measures the popularity of the game or gaming device. Some players desire to play the most popular game or gaming device 200 in the gaming establishment. To facilitate this desire, the game play may be changed to a game or gaming device fulfilling one of the following conditions:

total wagers exceeds a threshold for duration of time or game plays;

total number of game plays exceeds a threshold; and total time spent playing game exceeds a threshold.

In addition to the conditions listed above, there are a number of other types of conditions that can be used trigger reconfiguration of the gaming device. For example, a specific predetermined game outcome in a game may validate a condition that triggers an instruction. For example, a specific game outcome in Game A may trigger the reconfiguration of the gaming device to provide Game B. Alternatively, a specific game outcome may advance a player to a different level of play in the same game. The second game, triggered by a specific game outcome in Game A, may provide a bonus game (e.g., a free spin, multiplication by a factor for any winning game outcomes, etc.).

Another condition may be predicated on the successful completion of some portion of the game. For example, a condition might change game play if a player achieves a certain level of success (e.g., "I want to play Game A until I hit the bonus round, then I want to switch games").

In some cases, the condition allowing the reconfiguration may require the player achieving a degree of success in the game. A condition may be predicated on the partial successful completion of some portion of the game. For example, changing game play after a "near win" (e.g., four cards to the royal flush).

Certain conditions may require, in some embodiments, specified levels of wagering or other such requirements to qualify for participation in a promotional game such as a tournament. For example, the player may be required to satisfy a rate of play in the current game for a predefined period, satisfy a coin-in requirement, have a specified win/loss history, achieve certain outcomes, etc. For example, a specified game outcome on a first game may be a condition in order to reconfigure the gaming device to qualify and be eligible for a second game.

Generally, in one embodiment, determining if a condition is satisfied may comprise: (i) accessing a reconfiguration database to determine whether the condition is active, (ii) accessing a parameters database to determine a current parameter, and (iii) determining whether the condition is satisfied based on the parameter.

For example, a gaming server 106 may access a reconfiguration database 148 after each game play of each gaming device connected thereto. The server 106 may determine that a reconfiguration condition associated with Player A (e.g., who is currently playing Game A, as indicated by a network configuration database 147) is currently active. The condition, as indicated by the reconfiguration database 148 may be "10 consecutive losses occur on Game A" (with the associated instruction being "Switch from Game A to Game B").

Accordingly, the server 106 may access a parameters database 145 to determine a number of consecutive losses associated with Game A. If the number is equal to (or greater than) 10, it may be determined that the condition is satisfied.

As can be appreciated from the above discussion, any number of conditions may be created related to game play, players, gaming devices, equipment availability, promotions, competitive game play, collaborative game play, etc. that may be constructed, singly or in combination, to detect game play, player, or network related conditions or otherwise facilitate play on gaming devices. These conditions may then be used to trigger the implementation of an instruction to reconfigure the gaming device as discussed below.

Instructions

An instruction, or reconfiguration instruction in some embodiments, is an instruction that may represent an action, which may be performed upon the satisfaction of an associated condition. For example, an instruction may be to change a type of game being played from a first type to a second type. In some embodiments, an instruction to reconfigure a gaming device may be received from a player, operator, manufacturer, or other person. Instructions may be stored in a database (e.g., that correlates instructions for reconfiguring a gaming device to conditions upon which the reconfiguration is to occur).

A variety of different types of instructions governing the reconfiguration of a gaming device are possible. A database of example instructions and the corresponding example condition(s) under which those instructions are implemented is shown in reconfiguration database 500 of FIG. 5. The reconfiguration database may comprise, for example, the reconfiguration database 148 (FIG. 1) and/or the reconfiguration database 229 (FIG. 2). Some example instructions 510 contained in the example reconfiguration database 500 include: 1) switch to "Game B", 2) switch to "Machine B", 3) output offer to switch to "Machine B", 4) output offer to switch to "Game B", etc.

If it is determined that a condition is satisfied, a gaming device may be reconfigured based on an associated instruction indicated by the Reconfiguration database. Continuing with the above example, if 10 consecutive losses have occurred on Game A, the gaming device that Player A is currently playing (e.g., GD-1 as indicated by a network configuration database) may be reconfigured (e.g., a signal is sent from the server to the gaming device) such that Game B may be made available for play (e.g., one or more display devices are reconfigured to display indicia and logos of Game B, a package of sounds associated with Game B are loaded into volatile memory, etc.).

In general, the instructions 510 in the reconfiguration database 500 of FIG. 5 can be generalized as follows. These include:

- switching from a first game to a second game;
- switching from a first gaming device to a second gaming device; and
- switching from a first player to a second player.

Each of these different types of instructions is discussed below.

Switching from a First Game to a Second Game

Upon the satisfaction of a condition, the instruction 510 specifies a reconfiguration activity to alter game play. This activity may include switching from a first game to a second game. For example, the first game may be blackjack and the second game may be video poker. Upon the satisfaction of a condition, the gaming device presents a new game (i.e., the second game) to the player.

The new game may be stored with a plurality of different games in a memory for ready implementation as required by a gaming device. For example, turning to FIG. 2, in some embodiments, a games database 227 may be stored in the gaming device 200. If a triggering condition is determined, the gaming device 200 may be reconfigured to allow the selected game to be presented to the player on the primary video display 234 (e.g., to be uploaded to the CPU 210).

Alternatively, as shown in FIG. 1, games may be stored in the games database 146 on a gaming server 106 and available for downloading to a specific gaming device 102. If desired, in some embodiments, the programming that changes game play may be contained in modules (either hardware or software) that can be implemented based on the reconfiguration instruction.

For example, an instruction may exist to switch to "Game B" if the condition of "10 consecutive losses on "Game A" is satisfied (see FIG. 5). A player might select this instruction to cycle past "cold" games in the hopes of finding a better paying game. For example, the player may be automatically switched from a blackjack game to a video poker game. More generally, the player may be automatically switched from a first type of slot game to a second type slot game.

The change in game play from the first game to the second game may be less obvious. For example, the first game may be blackjack and the second game may be a form of the original blackjack game. The difference might be, for example, the number of wild cards in the deck, the number of decks used in the game play, etc. As another example, a poker game may require "Jacks or Better" for a period of time which upon contingent of the occurrence of a condition changes to "Quadruple Royal Flush Jacks or Better".

The changing game play may also include changing the level at which a game is played. Many games have various levels of game play. The access to the higher level (or next level) is dependent upon the success in the previous level. These games are often termed episodic type games, wherein the player has a number of opportunities to achieve goals (that may include winning game outcomes) that advances the player towards an overall game outcome upon successful completion of the game.

The changing game play may also include changing the payback percentage of the game, or of any new game, that replaces the previous game. For example, changing the game play may include changing the pay table—either the winning game outcomes or the amount paid for the winning game outcome. Special wagering techniques can be established that include "reverse" pay tables (e.g., wagering that the game outcome will not be a specified outcome, wagering that player will achieve a "losing" outcome, such that the player will be paid upon achieving a "losing" outcome, as is described in Applicants U.S. Pat. No. 6,113,492, filed Jun. 30, 1997, entitled "A GAMING DEVICE FOR OPERATING IN A REVERSE PAYOUT MODE AND A METHOD OF OPERATING SAME"). The probability table may also change making the game easier or more difficult to obtain a winning game outcome.

The player may be required to "qualify" for reconfigurations that improve game play payback percentages. These qualifications may be embodied in predetermined conditions associated with the reconfiguration database.

The game play may also change based on the appearance of the game. Different symbols, audio output, and themes may be presented to the player because of the reconfiguration. In some embodiments, changing a "game" may comprise changing one more visual elements associated with the game, perhaps without additionally changing an underlying probability and/or payout structure. For example, graphical elements of a slot game, such as reel symbols or other indicia, may be altered (e.g., the "skin" or "theme" is changed), though probabilities and payouts may not.

Furthermore, changing the game play may also include changing the functionality of peripheral devices associated with the gaming device to facilitate game play, and in particular, to facilitate game play as result of the reconfiguration. Game play on different types of games is facilitated by different types of pushbutton panel and touch screen layouts. To ensure that the appropriate input devices are selected and configured to facilitate game play of a particular game, the reconfiguration may alter the functionality of peripheral devices (e.g., an icon representing a button on a touch sensitive display screen is labeled "draw" instead of "spin").

Switching from a First Gaming Device to a Second Gaming Device

The instruction might also include switching from one gaming device to another gaming device based on the occurrence of a satisfied condition. In this embodiment, a gaming device on which a player places a wager may display the game outcomes generated by and/or received from a second gaming device. This instruction 500 is illustrated in FIG. 5 wherein the gaming device is reconfigured to "switch to Machine B" on the condition 512 that "$100 or more lost on Machine A."

In one or more embodiments, a player could also select to receive game outcomes from a gaming device that satisfies a selected parameter. For example, the player may specify that game outcomes should be provided from the "hottest" gaming device in the gaming establishment. Alternatively, the player may wish to receive game outcomes from the "coldest" gaming device on the gaming establishment floor. The gaming device that satisfies the specified parameter may be constantly changing.

Many of the conditions for determining a hot or cold game listed above can also be applied to determining hot or cold gaming devices. A player, rather than selecting a hot or cold game, may instead select a hot or cold gaming device using appropriate conditions similar to those described above for determining hot or cold games.

In addition to those listed conditions, gaming device may be switched when one or more gaming devices in physical proximity are hot or cold. For example, if the player is playing Machine A in Bank A, and Machine X is in Bank X:

A player may be switched to Machine X if one or more machines in Bank X become hot using one more conditions for determining whether a gaming device is hot. Alternatively, a player may be switched to Bank X if one more gaming devices in Bank A become cold.

In another embodiment, a player may be wagering on a gaming device that is limited to presenting game outcomes produced by other gaming devices or servers in which it is in communication. For example, the gaming device with which a player interfaces may be limited to the display of game outcomes, accepting wagers, receiving a signal to retrieve the game outcome from a second gaming device, receiving a game outcome from a second gaming device (e.g., outcome identifier), determining one more indicia to present based on the receipt of the outcome from the second gaming device, and so on—though the gaming device with which a player interfaces may not necessarily generate game outcomes itself (e.g., generate random numbers and correlate then to game results via a probability table).

This gaming device may be a handheld gaming device 120 with the primary function of reporting game outcomes produced by another gaming device in which is in communication. An example of a handheld gaming device 120 is a PDA, a cellular telephone, etc. A handheld gaming device 120, in one embodiment may only be capable of receiving game outcomes from another gaming device 102.

Such a handheld gaming device 120 may be used to report game outcomes obtained from a gaming device on which a player has wagered and placed in an automatic mode of operation (i.e., auto-play). In this automatic mode of operation, the gaming device plays continuously until the player's balance is depleted or until player specified parameters (such as number of game outcomes) is obtained. The player may view the game outcomes obtained from the gaming device in auto-play mode on the handheld gaming device 120. If the gaming device 102 switches games or gaming devices from which it receives game outcomes, the handheld gaming device 120 will also display the same game outcomes that result from the reconfigured game play. Similarly, an Internet linked personal computer 121 will operate similarly to the handheld gaming device 120 and display game outcomes that result from the reconfiguration—displaying the same game outcomes as the game outcomes obtained from games or gaming devices that have been switched to new games and gaming devices.

In some embodiments, the auto-play gaming device 102 or gaming server 106 from which the gaming device receives game outcomes may be required to be locked out from play by other players. When a gaming device is reconfigured to receive game outcomes from another gaming device for display on a standard gaming device or a handheld gaming device, the gaming device producing the game outcomes may either be locked out to other players or allowed to be played. The game outcomes received by the first player in the second player may be the same. Alternatively, the game outcomes received by the first player and the second player may both be generated by a single gaming device 102, but provide separate and independently derived game outcomes to the first player whose instruction caused the reconfiguration of the first player's gaming device to receive game outcomes from the second gaming device.

Methods for allowing players to use automated play techniques in a game machine are described in Applicant's U.S. Pat. No. 6,012,983, filed Dec. 30, 1996, entitled "AUTOMATED PLAY GAMING DEVICE", and US Patent Publication No. 2003/0114217, filed Dec. 27, 2002, entitled "METHOD AND APPARATUS FOR AUTOMATICALLY OPERATING A GAME MACHINE"; both patents are hereby incorporated in their entirety by reference for all purposes.

Switching from a First Player to a Second Player

Similar to the switching of gaming devices, a player may also obtain game outcomes from the gaming device at which a specified player is wagering. A player may be specified based on a variety of criteria. For example, player status level (e.g., win/loss history, amount wagered, etc.) may be determined in used to select a player. Further conditions can be specified that include not only the type of player from which game outcomes are to be received, but also specifying the type of machine, game, or area, that the player may wager.

Players that meet specified performance criterion are constantly changing; consequently, it may be desirable that the gaming network 100 determine (e.g., on a continuous basis) the player that meets the specified performance criterion and duplicate game outcomes from the specified player to the player that desires to receive those game outcomes.

As discussed above, basically the same conditions for determining "hot" or "cold" games may also be used determine "hot" or "cold" players. Many players would like to "piggyback" on the luck of another player. Consequently, a player would like to "piggyback" generally on a player with a successful wagering history. Conversely, some players might want to "piggyback" on a player with an unsuccessful wagering history—figuring the unsuccessful player is due a winning streak.

For example, an instruction can be made to receive game outcomes from the gaming device at which the player with the best financial return is playing. For example, player A may receive game outcomes from the gaming device of player B—as a result of player B having the best return on each wager. Player B may have a change of luck and player C may then have the best wager return. In accordance with an instruction, player A is automatically switched from receiving game outcomes obtained by player B to receiving game outcomes obtained by player C.

Because the player is receiving game outcomes obtained by other players, no decision-making is necessary on the part of the "piggybacking" player. Consequently, the player may be considered to be in an auto-play mode. Not only does the player automatically receive game outcomes, but the player may also be provided with automatic switching between games as conditions warrant.

The people on which "piggybacking" may occur may include, for example, predetermined players (e.g. family members), specified players with some casino status (player loyalty program), or simply all players wagering at the gaming establishment.

Methods for allowing players to "piggyback" on other players (i.e., receive the same game outcomes received by another player) are described in Applicant's U.S. Pat. No. 6,001,016, filed Dec. 31, 1996, entitled "REMOTE GAMING DEVICE", the patent is hereby incorporated by reference in its entirety for all purposes.

In certain embodiments, a player may select or specify conditions under which the player decides to switch out of a game; however, the player may not completely specify in the instruction a specific game into which the player is switched. For example, the player may only specify being switched into one of a plurality of games. Alternately, the player may specify being switched into any game. Consequently, the gaming establishment may randomly select a game for the player or determine based on a set of rules e.g., the "hottest" of a particular group), which game to provide the player.

In accordance with some embodiments, instructions do not necessarily require a game change; but may still alter game play. For example, a condition that satisfies a predetermined requirement may change the wagering strategy. For example, the player may specify that if 10 game outcomes in a row are lost, the wager amount automatically doubles for the next 10 game outcomes. Alternatively, an instruction may change the number of active pay lines, the source of funds from which a player is drawing a wager, etc.

Multiple Instructions/Conditions

In some embodiments, more than one instruction 510 may be implemented (e.g., concurrently). For example, the player may select an instruction 510 to "switch to machine B" on the condition that "$100 or more lost on machine A". The player may also select, concurrently, the instruction to "switch to Game B" on the condition of "10 consecutive losses on Game A". Machine A (the machine the player is currently playing) may offer both Game A and B.

If desired, both of the instructions 510 described above may be implemented concurrently. As conditions 512 for each of these instructions 510 is satisfied, change in game play is implemented. Consequently, a player may begin with Game A, receive 10 consecutive losses, be automatically transferred to Game B (still on Machine A), lose more than $100 on Machine A, and be automatically transferred to Machine B (still playing Game B).

Having the ability to specify multiple conditions 512 and instructions 510 allows the player to customize game play more precisely. Multiple concurrent conditions and instructions may be listed on a touch screen video display, facilitating the players selection process.

Specifying Instructions/Conditions

Player Specified Conditions/Instructions

Turning to FIG. 2, in some embodiments, players may, in some embodiments, specify instructions and conditions on the gaming device 200 through the player-tracking device 260 or through one of the video displays (i.e., the primary video display 234 or secondary video display 238).

Turning to FIG. 1, players may, in some embodiments, also customize player instructions on the gaming network 100 using one of many possible network devices 101. For example, an Internet linked personal computer 121 may use a gaming establishment's web site to specify instructions. For example, a player may customize instructions and/or conditions by using a gaming establishment's web site (e.g. such that the instructions/conditions are stored in a database maintained with a gaming establishment, such that when the player arrives at the gaming establishment and inserts a player tracking card, or otherwise provide identification, the gaming device may reconfigure based on the instructions/conditions previously supplied online).

Alternately, a kiosk 110 in the gaming establishment may be used to specify instructions. Portable handheld devices 120 (including wireless devices such as PDAs and cellular telephones) may also be used, in some embodiments, to send instructions/conditions to the gaming server 106.

A player may also request, in some embodiments, that various settings or preferences, conditions and instructions, may be stored (e.g., as a record of a database maintained within the memory of a gaming device 102 and/or server 106). In some embodiments, instructions may be retrieved with the player's player-tracking card identification number (e.g., a PIN or a smart card, biometric identifier, etc.). In this manner, a player's preferences or condition/instructions may follow the player from gaming machine to gaming machine as a player moves through the gaming establishment to play different games, or play in different locations within the gaming establishment.

Reminders may be displayed on the gaming device 102 to remind players of the instructions/conditions that have been set that may affect game play. In addition, the parameters that determine whether these conditions are met may also be displayed with their current values and with the triggering points that satisfy the condition. For example, if a player is playing Game A and an instruction is to switch to Game B upon the condition of 10 consecutive winning outcomes of Game B, an indication of the "current number of consecutive winning outcomes for Game B" might be presented to the player. For example, the reminder might be providing the message "switching to Game B in nine more losses".

The player may decide to change conditions or instructions during game play. These instructions/conditions may be deactivated or adjusted, for example, using the touch screen and touching the condition the player wishes to deactivate or adjust. For example, as conditions are toggled off, a red "X" (or the international "prohibited" symbol) may appear above the indication of the condition. The player may also cancel an instruction during a window of opportunity immediately after a condition has been satisfied to prevent the reconfiguration. for example, "switching to player B in five . . . four . . . three . . . —touch here to cancel switch."

Methods for customizing gaming devices are described in Applicant's U.S. Pat. No. 6,068,552, filed Mar. 31, 1998, entitled "A GAMING DEVICE AND METHOD OF OPERATION THEREOF"; U.S. Pat. No. 6,110,041, filed Dec. 30, 1996, entitled "METHOD AND SYSTEM FOR ADAPTING GAMING DEVICES TO PLAYING PREFERENCES"; and U.S. application Ser. No. 10/361,201, filed Feb. 7, 2003, entitled "A GAMING DEVICE AND METHOD OF OPERATION THEREOF"; the entirety of each are incorporated herein by reference for all purposes.

Operator Specified Instructions/Conditions

Turning to FIG. 1, in still another embodiment, the operator of the gaming establishment may determine criterion under which game play may be switched to a different type game with the gaming network 101. This criterion may be related to special promotions, availability of gaming devices, and competitive/collaborative game play. The gaming establishment may, for example, in some embodiments, predetermine the instruction/conditions that automatically reconfigure a gaming device to alter game play.

An example of an operator specified instruction includes a player that has wagered more than a threshold dollar amount, or a player that has lost more than a threshold dollar amount may be rewarded by automatically changing game play to offer a player free spins on a game. Game play may also change to reward player for inserting additional currency or otherwise providing additional credits to the gaming device, for length of time spent at the gaming establishment, for purchasing goods and services at the gaming establishment, etc.

Alternatively, the new game may provide an opportunity to win player loyalty points, as part of the gaming establishment's player loyalty program—typically tracked by the player database 144. This opportunity to win additional player loyalty points may be triggered when the gaming device 102 detects boredom (e.g., based on the player win/loss game history, directional player's gaze, etc.). Boredom may be detected based on speed of play, wagering size, playing pattern, consecutive losses, the player's overall win to loss ratio, etc. When such an event is detected, the player may be offered or automatically switched into the loyalty points game.

The loyalty points game does not require any further wager, but determines a game outcome that provides a player with some number of loyalty points, which is then accrued to the player's account. The number of player loyalty points may be predetermined or may be randomly selected by the loyalty game outcome. The player may be given one game outcome or several game outcomes to accrue player loyalty points. When the final game outcome has been determined, the player is automatically returned to the previous game. Consequently, the player loyalty game may be an interlude or break for the player, from the gaming session.

In an alternative embodiment, the game play may automatically shift from a first wagering game to another game based on the game outcome of the first wagering game. The specific game outcome on the first wagering game may be randomly determined. Alternatively, the specific game outcome on the second wagering may be intentionally produced when a condition is satisfied.

Players may also be switched to other games as part of promotional activities to advertise new games as well as games that are underutilized. Promotional activities may include offers of free game plays, etc. By switching players into such games, players may experience the game for free or at greatly reduced cost, allowing the gaming establishment to promote the game. Because the gaming establishment is controlling the switch (or at least the offer) from the current game into the promotional game, the gaming establishment can also control the timing of the promotion's termination and return the player to standard wagering games. This allows the gaming establishment to control losses incurred with special promotional game offers.

The games and gaming devices promoted may be selected based on any number of different criteria. Furthermore, the number of games that are promoted simultaneously may also be based on specific criterion. For example, the number of games promoted (e.g., on a scroll bar on the game display) may be determined by the player's rate of play, payback percentage, etc. Alternately, the games promoted may be based on a strategic marketing mix that includes a relatively new game, a "hot" machine, and an "underutilized" game. Such mix is designed to provide a limited selection that is broad enough to satisfy the player, yet still achieved the objectives of the gaming establishment.

Certain games may be promoted more heavily by providing larger icons or display space to promote the game in the game display. Alternatively, certain games may be promoted more heavily simply by displaying the promoted game longer on the game display.

Underutilized games may also be identified and promoted for player use. For example, a player receiving game outcomes on a handheld gaming device 120 may receive an offer to receive game outcomes from one of these underutilized gaming devices 120. Similarly, a player accessing the gaming network 100 through an Internet linked personal computer 121 might also be offered to receive game outcomes from an underutilized gaming device 120.

Another example of a gaming establishment specified instruction is, to some extent, an incomplete player specified instruction. For example, the player may not have any preference regarding the instructions/conditions for switching games or the games to which the player is switched. For example, the player may specify, "Let the casino control my fate". The player may register this as a preference for a period of time or number of game plays (e.g., "Let the casino control what games I play for next 10 spins").

Another example of a gaming establishment specified condition is the establishment of a failsafe system for the gaming network 100 in the event of a networked device 101 failure. This is particularly important in a thin-client network, where game outcomes are heavily dependent upon a central server and other ancillary network devices 101 required to support potentially hundreds of thin-client gaming devices 102. Any disruption in a key support network device 101 could disrupt the operation of many gaming devices 102.

Conditions and instructions may be specified by the operator to switch to alternate gaming servers or gaming devices that provide the same game (or any game) that can be played by the player during the network disruption. The gaming operator may establish a database that correlates each game to a similar game having similar denomination, available pay lines, payback percentages, game type, etc. to minimize the effect of the disruption on the player by substituting the most similar game possible.

Instructions and conditions for gaming establishment specified conditions and instructions may be coded in the gaming device's 102 game program 214 or in the software of the gaming server 106 (e.g., game program 117). These instructions may also be stored in the reconfiguration database 229 of the gaming device 200 shown in FIG. 2 or in the reconfiguration database 148 located in the data storage device 124 shown in FIG. 1. In some embodiments, a gaming device or a gaming device identifier may be hardwired with conditions and reconfiguration rules to automatically affect changes in game play.

The operator of the gaming establishment may, in one embodiment, also include in a reconfiguration database an additional field that determines when a condition/instruction is active or inactive (in some embodiments, the player may also have this capability to determine whether or not the reconfiguration condition is active).

For example, turning to FIG. 1, in a situation wherein separate instances of the same game is downloaded from server 106 to two different gaming devices 102, two different games on these gaming devices may result dependent upon whether or not the condition/instruction associated with these two separate game instances is active or inactive for each of these gaming devices. For example, if one gaming device has an active reconfiguration field, the game play may be altered. Conversely, the second gaming device may have an inactive reconfiguration field keeping the same game on the gaming device. Consequently, two players playing the same game, as separate instances of that game as provided by the server 106, may experience different games and game play. In an alternate embodiment, the player may also specify whether or not the instruction is active or inactive.

Offer

In some embodiments, players may be presented with offers to switch to different games, giving devices, or players—rather then automatically implementing reconfiguration of the gaming device. Consequently, although an automatic change in game play may occur once a condition is satisfied, alternatively, a game play change may be made optional to a player. For example, when the condition specified is satisfied, rather than implementing the instruction, an offer can be made to the player to implement the instruction. The player may then decline or accept the offer. The player may accept offers through the touch screen display or potentially through the pushbutton panel.

An offer may be any type of game play alteration that can potentially be implemented through the reconfiguration of the gaming device. This includes all the example game play alterations is discussed above including: changing the game, changing the type of game, changing the payback percentage of the game, receiving game outcomes from other gaming devices, specifying receiving a particular player's game outcomes, etc.

Offers may be permanent or transitory on the gaming device display. Transitory offers may last for a predetermined number of game plays, for a predetermined period of time, etc. Offers for "hotter" games may be promoted for longer periods of time. For example, if a payback percentage is between 100 and 110%, the game may be promoted for three minutes. Alternatively, if the payback percentage is between 110 percent and 120 percent, the game may be promoted for four minutes.

Multiple offers may be made to the player. The number of games offered, or promoted, may be related to the speed of game play. For example, a player may be offered five different games when playing at 10 spins per minute or six games when playing at nine spins per minute. Rules may be set for offering a minimum or maximum number of games. For example, a rule might be "pick the top five games in terms of payback percentage in the past hour and promote them".

Figure 11:
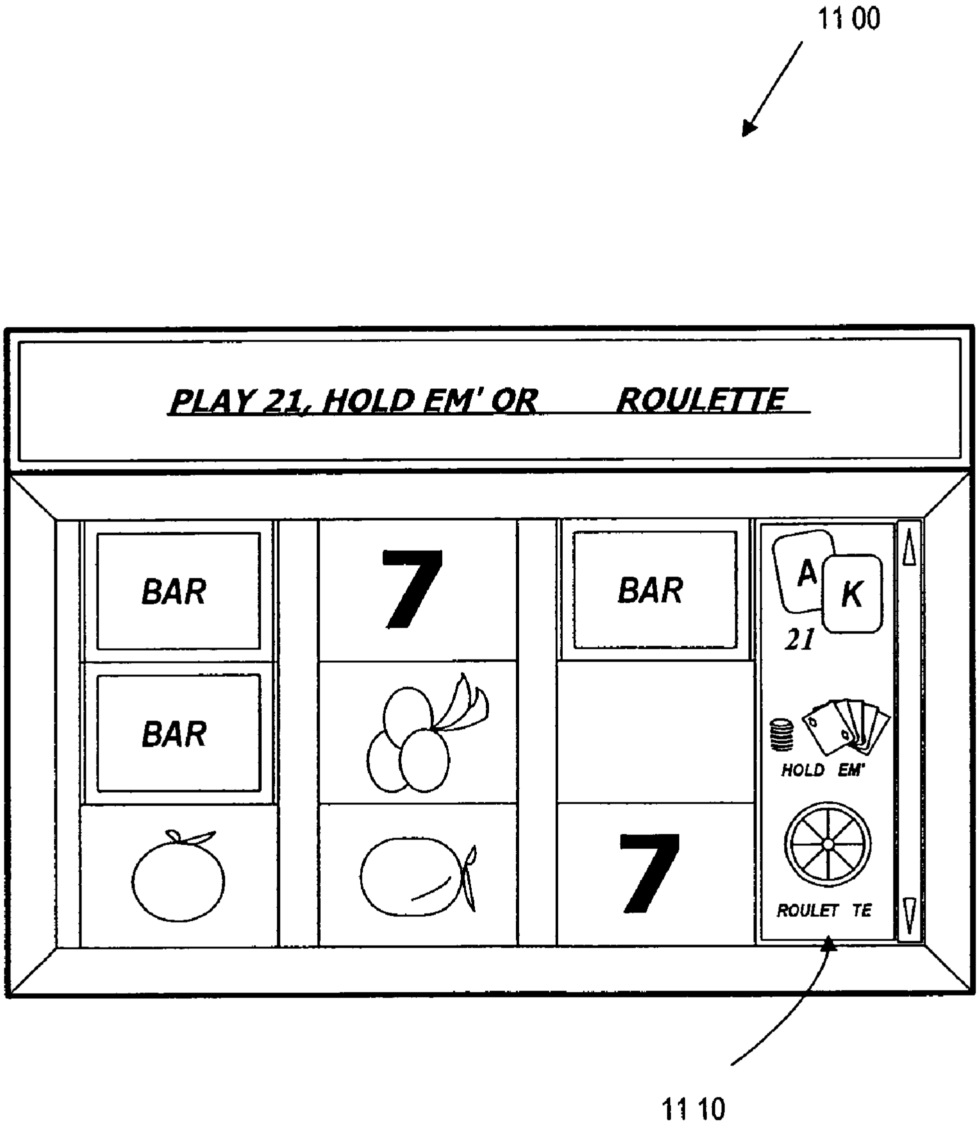
FIG. 11 is an example of a sidebar for displaying offers and other information to a player.

In some embodiments, the number of games, gaming devices, or players that are promoted simultaneously may also be based on specific criteria. The actual number of multiple offers that are selected for display and offered to the player may be composed in accordance with any number of different rules. For example, as shown in FIG. 11, one rule may indicate to always promote the "top three" games in a sidebar 1110 as shown in the sidebar video display 1100. The sidebar 1110 may be scrolled to present a continuous stream of information. These top three games may change over time and the sidebar may automatically be updated as these games change. In another embodiment, the sidebar may be scrolled (i.e., scrolling sidebar) which shows promoted games changing over time as the scroll moves. Alternatively, another rule, for example, might be "promote three gaming devices including one "new" gaming device, one "hot" gaming device, and one "underutilized" gaming device. Such a mix is designed to provide a limited selection that is broad enough to satisfy the player, yet still achieve the objectives of the gaming establishment.

The offer may be presented to the player as a picture-in-a-picture on the primary video display 234, on a separate secondary video display 238, as a sidebar or scroll bar longitudinally placed along the edge of the video display, etc. Offers may be represented by icons that may be larger for "hotter" games.

Gaming devices or players that are unavailable may be "ghosted" or "grayed" out or otherwise indicated as unavailable. Offers may be deleted or minimized by the player to provide the player with a full, unobstructed view the gaming display. Deleted offers may cause the gaming device to generate new offers for display to the player.

Even if the player does not accept the offer, the game outcomes from another machine may be displayed to the player. For example, a player playing a first game might be shown a promotional video depicting a bonus round recently occurred on another gaming device (e.g., "look at how well Player X did in a bonus round of Game B"). In lieu of displaying actual game play from another gaming device, video clips of typical game outcomes and game play (e.g., from actual archived historical game play) can be displayed. Any of these displays can be either static are provided in video format. Furthermore, the presentation of these video clips or pictures may occur in the form of a scroll bar on the side of the video display or in a "picture-in-picture" type display on the video display.

The presentation of these offers may be "collapsible" or "minimizable" at any time, or may be collapsed or minimized upon expiration of the offer. Collapsed or minimized offers may still be available, although they may take up a smaller portion of the display area and/or may require accessing a separate screen before they may be accepted.

Offers may include statistical analysis of the game outcomes, the player's, or the gaming device to demonstrate to the player what would have happened if the player had selected a specific gaming device. For example, a number of coins recently paid by machine B, a number of players currently playing Game B, a number of consecutive wins achieved by player B. In some embodiments, parameters that are output are the same parameters that satisfied a condition such that the game, machine, or a piggyback player is offered in the first place. For example, if an instruction is to offer Game B when 35 or more players are currently playing game B, Game B may be offered, and the number of players (35+) may be additionally output.

In some cases, offers may not be available until the player has earned or qualified for the offer. These offers may be conditioned on certain types of game play, wagering amounts, amount wagered losses, etc. Once the condition requirements are met, the player may be eligible, in some embodiments, to play previously unavailable games, gaming machines, or piggyback on the play of other players.

To accept an offer, players may provide input via the touch screen, pushbutton on the pushbutton panel, or through the player-tracking device. Accepting the offer has the effect of altering the game play for the offers instructions.

Reconfiguration Timing

Whether an offer is accepted or there is an automatic triggering of the reconfiguration, the reconfiguration may take place immediately or at some predetermined time. For example, once the condition is satisfied the reconfiguration may take place at a future time, after a number of game outcomes are received, after a specified number of winning game outcomes are received, after a specified type of game outcome is received, or immediately after a game outcome is received.

In certain situations, the reconfiguration may be triggered while game play is still occurring on the gaming device. In this case, the timing of the reconfiguration may be delayed until the game outcome of the previous game has been fully played out. In certain circumstances for example, a player may have a number of free spins remaining on the first game while triggering the reconfiguration of the game. The reconfiguration would then be delayed until the player has finished the game play (free spins) before the reconfiguration of the gaming device. Other examples of the gaming device operation that may be completed prior to reconfiguration include: waiting until the reels of the first game stopped spinning, until all credits have been added to the credit meter, and until all sound effects and visual presentations have been completed.

Although the above delay in reconfiguration is described in the context of changing games at a gaming device, it is equally applicable to changing games to procure game outcomes on different gaming devices. The reconfiguration to receive a game outcome from a second gaming device is delayed until the game on the first gaming device is fully played. Furthermore, the reconfiguration to the second gaming device may be delayed until the second gaming device has fully played out a game outcome that is in the process of occurring at the time the condition for reconfiguration was satisfied.

Alternatively, in some embodiments, game play could be immediately interrupted, the game device reconfigured for altered game play, the altered game play completed, and the player returned to the original first game for completion of the first game.

The fact that the player has achieved the condition allowing reconfiguration may be displayed on the gaming device as an incentive for the player to continue game play. Once the reconfiguration occurs, in some embodiments, the altered game play may exist for only a predetermined time before the player is switched back to the original game play.

A special situation exists, where a player desires to receive the game outcomes from another gaming device. Even in a situation where all the conditions are satisfied, if the gaming device is not available (i.e., another player wagering on a gaming device) the instruction cannot be satisfied and the player may wait until that specified gaming device is again available.

For example, a player may register for a tournament and once that tournament begins, the player's gaming device may shift game play mode, exit the current wagering game, and enter the tournament (or any competitive, collaborative, otherwise multiplayer gaming function. This capability allows a player to wager in an independent mode and as opportunities become available, shift seamlessly to a competitive/collaborative mode of group gaming wherein a single game outcome may affect a number of players simultaneously. This customization feature allows a player to select the type of game play the player want to participate in and reject those that are not desired without bothering a player for each potential gaming opportunity that may be available.

Controlling Network Configuration

Turning to FIG. 6, an example of a network configuration database 600 with exemplary data records is presented, in accordance with one example embodiment. The network configuration database 600 may comprise, for example, the network configuration database 147 (FIG. 1). The network configuration database 147 may be present in some embodiments to facilitate network communications to assist the gaming server 106 to perform its communication, accounting, player tracking, and other similar functions. The complexity of network communications is a result of the reconfiguration of the gaming devices 102 occurring in the gaming network 100.

For example, in one embodiment, as discussed above, a gaming device may receive and display game outcomes obtained from another gaming device. This presents a number of difficulties associated with communicating game outcomes over the gaming network 100 from the selected gaming device to the receiving gaming device.

In addition, further difficulties are associated with insuring that winning game outcomes are paid to the appropriate gaming device and player. Furthermore, even before game outcomes are received, the gaming network 100 may constantly determine the gaming device 102 that satisfies a specified parameter and appropriately configure the network to provide the game outcomes from the correct machine to the player that requested the specified gaming device's game outcomes.

In order to track the configuration of the gaming network 100 and provide the functions required for reconfiguration, a network configuration database 147 as shown in FIG. 1 can be established to track and maintain the current configuration status of the gaming network 100. The network configuration database 147 may be maintained, in one embodiment, in a data storage device 124 or in the memory of gaming server 106.

The exemplary network configuration database 600 shown in FIG. 6 is for three players 602 (P-1, P-2, and P-3). The database 600 includes the gaming device 604 the player may be operating, the game type 606, whether the gaming device is operated as a "piggyback" machine 608, whether a player is a piggyback player 610, and whether the player is offered alternate games 612. FIG. 600 can be interpreted as follows.

Player 1 is playing Gaming Device 1. Gaming Device 1 is running Game Type 1. The player is also being presented with offers to play Game Type 2 and Gaming Device 5.

Player 2 is playing Handheld Gaming Device 1. Handheld Gaming Device 1 is being used to view outcomes generated by Gaming Device 4. Gaming Device 4 is running Game Type 4.

Player 3 is playing remotely from his home PC via the Internet. Player 3 is "piggybacking" on Player 1. Since Player 1 is playing Game Type 1 on Gaming Device 1, Player 3 is indirectly playing these (indirect nature of play denoted by parenthesis).

The network configuration database 147 may be constantly updated as reconfigurations occur, and assist the gaming network 100 to maintain communication and proper accounting for each gaming device 102.

Examples of Supported Games

Turning to FIG. 1, all different types of games, including all standard slot type games and video games may use conditions to trigger the reconfiguration of the gaming devices 102, whether the reconfiguration is isolated to features provided only by the gaming device or whether additional features are provided from the gaming network 100 and its network devices 101. General game categories are discussed below to provide examples of how conditional reconfiguration may be applied.

Competitive/Collaborative Games

In addition to the standard types and games, reconfiguration can be applied to competitive and collaborative type gaming. For example, players on a gaming network 100 may receive bonuses for having the highest score or any other success related parameter. Consequently, the gaming network 100 may have a condition that identifies such a player, and provides that player a bonus. This bonus may relate to receiving a higher payback percentage, receiving a percentage from all other players wagering on the gaming network 100, or identification and recognition as the best player.

Conditions may be used to match players in competitive game play. For example, the two best players may be selected for a playoff. Conditions and instructions may also be implemented that facilitate the forming of competitive and collaborative teams. These teams may be formed from players based on satisfying any number of conditions. Conversely, the reconfiguration may monitor game play and determine when a player should be removed from a team or the competitive/collaborative game.

Tournament Games

Many gaming establishments offer tournaments to players. These tournaments's often use slot-type games and a point or credit system to identify the player with the highest score in a predetermined time and provide a tournament award. The gaming network 100 may be programmed to identify the start and end of the tournament, as well as the players desiring to participate in the tournament and provide appropriate notification through the gaming network 100 to each of the appropriate players when the tournament commences. In addition, the gaming network 100 may reconfigure the gaming device 102 to provide participating players with the appropriate game. The tournament may comprise a number of different games in which the player may compete. The gaming device 102 may be reconfigured to provide each subsequent game on the condition that the player completes the previous required game.

Flat Rate Gaming

Flat rate gaming sessions offer the opportunity to purchase a bundle of game plays for a specified price or, alternatively, to buy a predetermined time period for unlimited plays of the gaming device. In one embodiment, multiple flat rate gaming sessions may be purchased. One flat rate session may be played by the player on the gaming device 102 while a second flat rate gaming session is automatically executed on the player's behalf. The second flat rate gaming session may display limited game play data, such as icons or indicia that indicate game outcome, credit balance, etc. This second flat rate gaming session may be displayed on a separate video display or in an area of a primary video display such as a picture-in-picture type display or sidebar.

The second flat rate gaming session may only become available for play if conditions are satisfied in the first flat rate session and/or second flat rate session (e.g., a player may desire to "shift control" from a first flat rate session to a previously automated second flat rate session if the second session becomes "hot" or if the first session becomes "cold"). A degree of interactive action may exist between the first flat rate session and the second flat rate session such that the second flat rate session only executes based on the satisfaction of conditions/parameters in the first flat rate gaming session.

In some embodiments, the game that is played may alternate automatically between the games as conditions are satisfied. For example, a first flat rate gaming session may act as a base game and a second flat rate gaming session may act as a bonus game. If the conditions for playing the second flat rate gaming session bonus game are satisfied by the first flat rate gaming session, the player is transported to the bonus game and allowed to play until a game outcome or condition forces the player back into the first flat rate gaming session.

The parameters database 145 may be used to time or record game outcomes received by the player in the flat rate session and act to terminate the flat rate gaming session by reconfiguring the gaming device 102 back to its original configuration and end the flat rate gaming session.

Methods for establishing flat rate playing sessions are described in Applicant's U.S. Provisional Patent Application Ser. No. 60/627,670, filed on Nov. 12, 2004 and entitled GAMING DEVICE OFFERING A FLAT RATE PLAY SESSION AND METHODS THEREOF "; U.S. Provisional Patent Application Ser. No. 60/679,138 filed on May 9, 2005 and entitled SYSTEMS, METHODS, AND APPARATUS FOR FACILITATING A FLAT RATE PLAY SESSION ON A GAMING DEVICE; the content of each application hereby incorporated by reference in their entirety.

Special Bonusing/Jackpot Games

Many gaming devices 102 have games that offer jackpots, especially progressive jackpots. Many gaming devices do not have any jackpots—despite the popularity of progressive jackpots among players. Reconfiguration provides another method for reconfiguring gaming devices that may not have a jackpot, or even gaming devices that do have a jackpot, to be reconfigured upon some condition that allows a player a chance to play for a jackpot game. In one embodiment, this condition may be unrelated to the game outcomes received by the player. For example, the player with the greatest number of loyalty points on the network might be allowed a chance to play the jackpot game. Alternatively, the player that has played the longest may be given a chance to play for the jackpot. The player may even be selected randomly to participate in the jackpot game. The player may allowed to participate in the jackpot game, in one embodiment, for a period or game plays and on the condition the player loses, the gaming device is reconfigured and the player is exited from the jackpot game.

CONCLUSION

Although the foregoing described only a few of the most popular wagering games to which reconfiguration can be applied, it should be appreciated that any type of wagering game implemented with gaming devices can be reconfigured when a condition is satisfied. Further, these gaming devices are not limited to the embodiments described (i.e., video gaming devices, such as video slot machines and video poker machines), but can also be applied to other types of gaming devices, such as video roulette machines, video blackjack machines and the like. Furthermore, it is also possible to employ electromechanical gaming devices such as gaming devices with mechanical reels that determine game outcomes as another embodiment that may use the methods and apparatus discussed herein.

Thus, while the present invention has been described in terms of certain embodiments, other embodiments that are apparent to those of skill in the art are also intended to be within the scope of the present invention. Accordingly, the scope of the present invention is intended to be limited only by the claims appended hereto.

We claim:

1. A method for controlling a gaming device, said method comprising:

facilitating, via a processor of at least one of a gaming device configured to operate to facilitate a wagering game and a server operatively connected to the gaming device, a wagering game on a first gaming device;

specifying a condition that initiates a reconfiguration of the first gaming device;

monitoring, via the processor, for an occurrence of the specified condition; and causing, via the processor, a reconfiguration of the first gaming device in response to the occurrence of the specified condition, wherein the reconfiguration changes game play at the first gaming device from determining outcomes at the first gaming device based on occurrences at the first gaming device to determining outcomes at the first gaming device based on occurrences at a second gaming device selected from a plurality of gaming devices.

2. The method as recited in claim 1, wherein the condition is specified by a player.

3. The method as recited in claim 1, further comprising specifying an instruction that selects the second game.

4. The method as recited in claim 3, wherein the instruction is a function of an indication of an outcome of each of the plurality of gaming devices.

5. A method of operating a gaming device, said method comprising:

accepting a wager on a first game in association with a first gaming device;

monitoring, via a processor of at least one of the first gaming device and a server operatively connected to the first gaming device, for an occurrence of a specified condition, the specified condition including at least one parameter of the first gaming device selected from the group consisting of: a ratio of winning outcomes to losing outcomes over a predetermined period of time, a ratio of winning outcomes to losing outcomes over a predetermined number of game plays, a number of consecutive winning outcomes, a number of consecutive losing outcomes, and a difference between an amount wagered and an amount paid;

upon the occurrence of the specified condition, making an offer to a first player of the first gaming device to initiate a reconfiguration of the first gaming device; and upon the first player accepting the offer, reconfiguring, via the processor, the first gaming device by switching from the first game to a second game.

6. The method as recited in claim 5, wherein the offer is one of: a persistent offer and a transitory offer.

7. The method of claim 5, wherein reconfiguring further comprises: switching from a random number generator of the first gaming device to a random number generator of a second gaming device.

8. The method of claim 5, further comprising:

displaying, on the first gaming device, at least one game play results of at least one other player of at least one other game on at least one other gaming device.

9. A method of operating a gaming device, said method comprising:

accepting a wager on a first game in association with a first gaming device;

monitoring, via a processor of at least one of the first gaming device and a server operatively connected to the first gaming device, for an occurrence of a specified condition, the specified condition including at least one parameter of a second gaming device;

upon detection of the specified condition, making an offer to a first player of the first gaming device to initiate a reconfiguration of the first gaming device; and upon the first player accepting the offer, reconfiguring via the processor the first gaming device by switching from the first game to a second game.

10. The method of claim 9, further comprising: switching from the first game to a second game as a function of the at least one parameter of the second gaming device.

11. The method of claim 10, wherein the at least one parameter of the second gaming device is one of:

a ratio of winning outcomes to losing outcomes, over a finite period of time;

a ratio of winning outcomes to losing outcomes, over a predetermined number of game plays;

a number of consecutive winning outcomes; a number of consecutive losing outcomes; and a difference between an amount wagered and an amount paid.

12. The method of claim 9, further comprising: switching from a random number generator of the first gaming device to a random number generator of the second gaming device.

13. The method of claim 9, further comprising: changing at least one of a wagering strategy and a playing strategy of the first game as a function of the at least one parameter of the second gaming device.

14. The method of claim 9, further comprising: changing at least one of a pay table and a payout table of the first game as a function of the at least one parameter of the second gaming device.

15. A gaming device comprising:

a processor; and a memory operatively connected to the processor, the memory storing a program, that when executed by the processor, cause the processor to:

facilitate a wagering game on a first gaming device;

specify a condition that initiates a reconfiguration of the first gaming device;

monitor for an occurrence of the specified condition; and cause a reconfiguration of the first gaming device in response to the occurrence of the specified condition, wherein the reconfiguration changes game play at the first gaming device from determining outcomes based on occurrences at the first gaming device to determining outcomes based on occurrences at a second gaming device selected from a plurality of gaming devices.

16. A non-transitory computer readable medium storing instructions for directing a processor of a computer to execute a method comprising:

facilitating a wagering game on a first gaming device;

specifying a condition that initiates a reconfiguration of the first gaming device;

monitoring for an occurrence of the specified condition; and causing a reconfiguration of the first gaming device in response to the occurrence of the specified condition, wherein the reconfiguration changes game play at the first gaming device from determining outcomes based on occurrences at the first gaming device to determining outcomes based on occurrences at a second gaming device selected from a plurality of gaming devices.

17. A gaming device comprising:

a processor; and a memory operatively connected to the processor, the memory storing a program, that when executed by the processor, cause the processor to:

accept a wager on a first game in association with a first gaming device;

monitor for an occurrence of a specified condition, the specified condition including at least one of:

(a) at least one parameter of the first gaming device selected from the group consisting of: a ratio of winning outcomes to losing outcomes over a predetermined period of time, a ratio of winning outcomes to losing outcomes over a predetermined number of game plays, a number of consecutive winning outcomes, a number of consecutive losing outcomes, and a difference between an amount wagered and an amount paid, and (b) at least one parameter of a second gaming device;

upon the occurrence of the specified condition, make an offer to a first player of the first gaming device to initiate a reconfiguration of the first gaming device; and upon the first player accepting the offer, reconfigure the first gaming device by switching from the first game to a second game.

18. A non-transitory computer readable medium storing instructions for directing a processor of a computer to perform a method comprising:

accepting a wager on a first game in association with a first gaming device;

monitoring for an occurrence of a specified condition, the specified condition including at least one of:

(a) at least one parameter of the first gaming device selected from the group consisting of: a ratio of winning outcomes to losing outcomes over a predetermined period of time, a ratio of winning outcomes to losing outcomes over a predetermined number of game plays, a number of consecutive winning outcomes, a number of consecutive losing outcomes, and a difference between an amount wagered and an amount paid, and (b) at least one parameter of a second gaming device;

upon the occurrence of the specified condition, making an offer to a first player of the first gaming device to initiate a reconfiguration of the first gaming device; and upon the first player accepting the offer, reconfiguring the first gaming device by switching from the first game to a second game.

* * * * *

UNITED STATES PATENT AND TRADEMARK OFFICE

CERTIFICATE OF CORRECTION

PATENT NO. : 7,918,736 B2
APPLICATION NO. : 11/299341
DATED : April 5, 2011
INVENTOR(S) : Walker et al.

It is certified that error appears in the above-identified patent and that said Letters Patent is hereby corrected as shown below:

In the Claims:

Column 35, Line 25, replace “the second game” with --the second gaming device--.

Column 35, Line 59, replace “results” with --result--.

Signed and Sealed this
Fifth Day of July, 2011

David J. Kappos
*Director of the United States Patent and Trademark Office*